United States Patent [19]

Lepper et al.

[11] Patent Number: 5,607,642
[45] Date of Patent: Mar. 4, 1997

[54] INTERACTIVE CONTROL SYSTEM FOR PACKAGING CONTROL OF CONTACT LENSES

[75] Inventors: John M. Lepper; Russell J. Edwards; Daniel T. Wang, all of Jacksonville, Fla.

[73] Assignee: Johnson & Johnson Vision Products, Inc., Jacksonville, Fla.

[21] Appl. No.: 257,793

[22] Filed: Jun. 10, 1994

[51] Int. Cl.⁶ .......................... A45C 11/04; B29D 11/00
[52] U.S. Cl. .......................... 422/62; 198/340; 206/5.1; 264/2.6; 364/468.17; 414/909; 901/7
[58] Field of Search .......................... 264/2.1, 2.6; 364/468, 364/469, 473, 478, 569; 198/340, 341; 414/909; 425/808; 523/106; 206/5.1; 901/7; 422/40, 62

[56] References Cited

U.S. PATENT DOCUMENTS

| | | | |
|---|---|---|---|
| 2,960,207 | 11/1960 | Zilai | 198/340 |
| 4,495,313 | 1/1985 | Larsen | 523/106 |
| 4,565,348 | 1/1986 | Larsen | 425/808 |
| 4,640,489 | 2/1987 | Larsen | 425/808 |
| 4,680,336 | 7/1987 | Larsen et al. | 264/2.6 |
| 4,691,820 | 9/1987 | Martinez | 206/5.1 |
| 4,889,664 | 12/1989 | Kindt-Larsen et al. | 264/2.6 |
| 4,930,086 | 5/1990 | Fukasawa | 364/468 |
| 4,986,414 | 1/1991 | Ashley et al. | 206/5.1 |
| 5,039,459 | 8/1991 | Kindt-Larsen et al. | 264/2.6 |
| 5,080,839 | 1/1992 | Kindt-Larsen | 264/2.6 |
| 5,084,829 | 1/1992 | Kato | 364/478 |
| 5,094,609 | 3/1992 | Kindt-Larsen | 264/2.6 |
| 5,222,855 | 6/1993 | Bernard et al. | 198/340 |
| 5,262,954 | 11/1993 | Fujino et al. | 364/478 |
| 5,375,061 | 12/1994 | Hara et al. | 364/478 |
| 5,394,988 | 3/1995 | Edwards et al. | 206/5.1 |

*Primary Examiner*—Joseph W. Drodge

[57] ABSTRACT

An interactive control system for controlling the automatic packaging of contact lenses in a contact lens fabrication facility, the interactive control system consisting of a first robot device for periodically transferring individual arrays of a first predetermined amount of discrete contact lens packages each containing a contact lens therein from a first station to an intermediate conveyor where the individual arrays are conveyed to a second station, and a controller for initiating a time stamp for each individual array transferred from the first station and determining elapsed time data for each individual array and for generating position status data indicating a good array or a bad array of defective lenses for each individual array as it is conveyed to the second station, the controller shifting the elapsed time data and position status data for each individual array as it is conveyed on the intermediate conveyor for transfer to the second station.

34 Claims, 19 Drawing Sheets

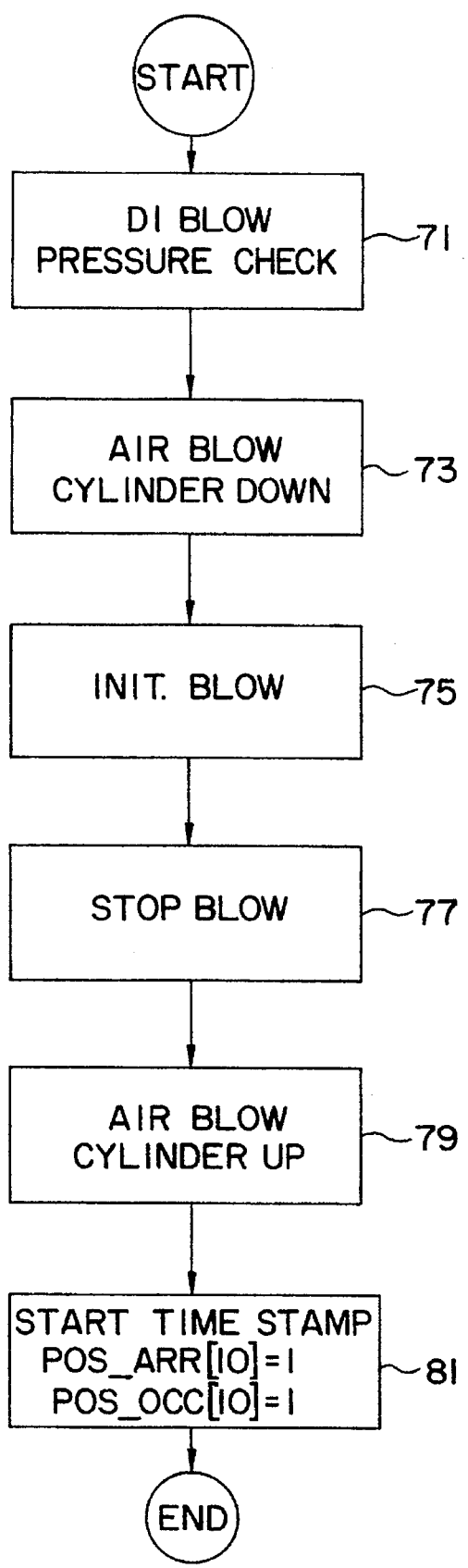

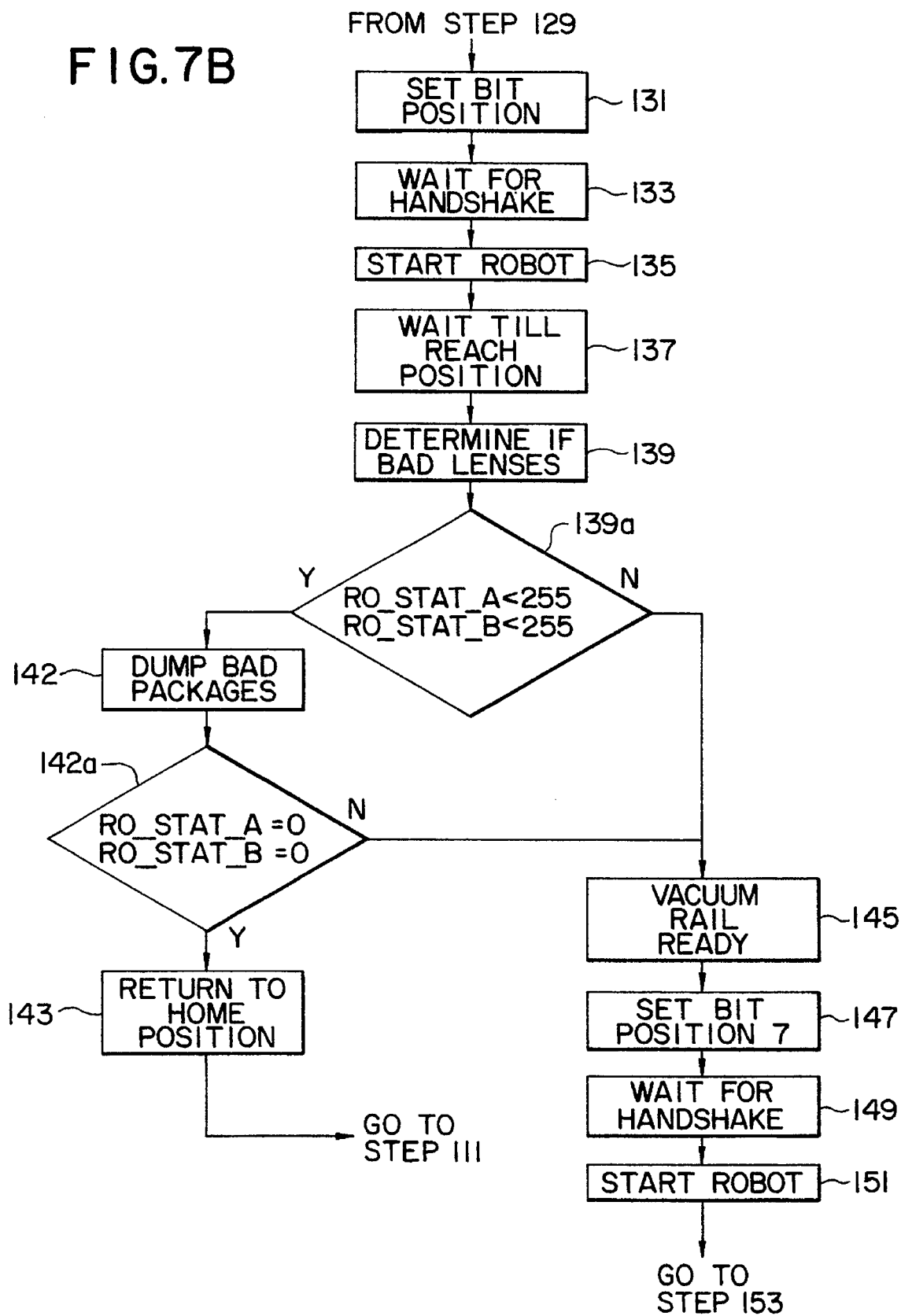

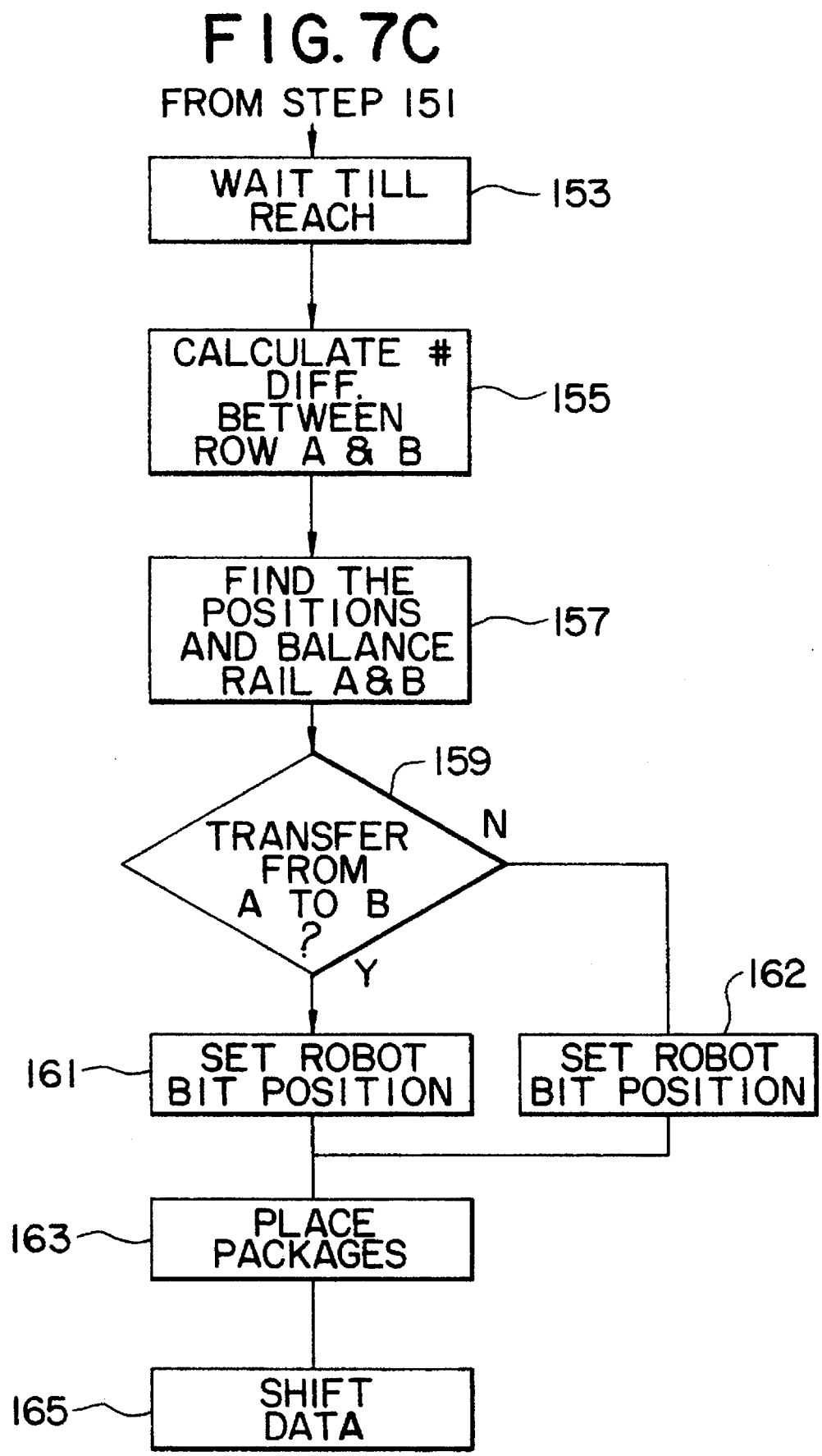

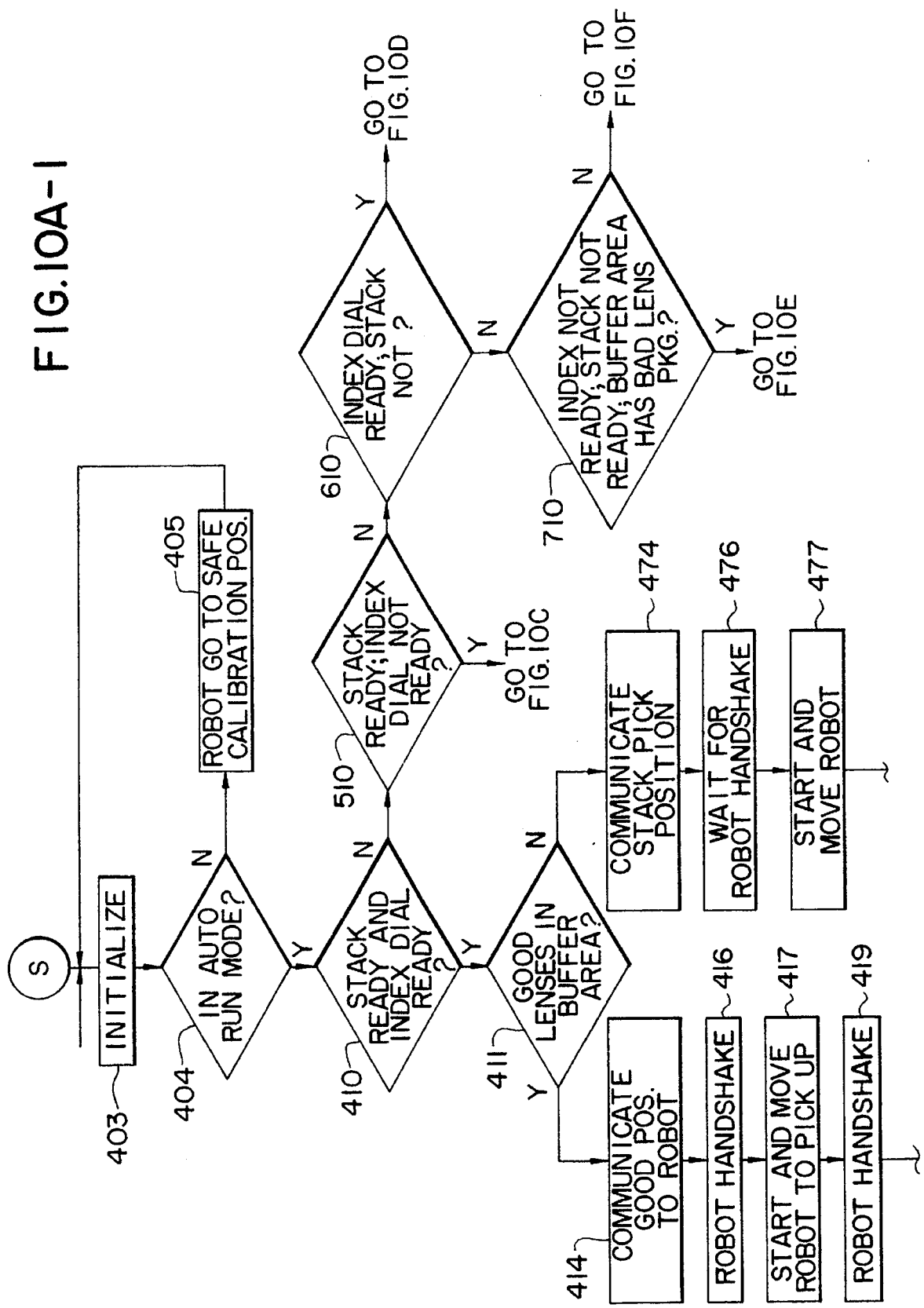

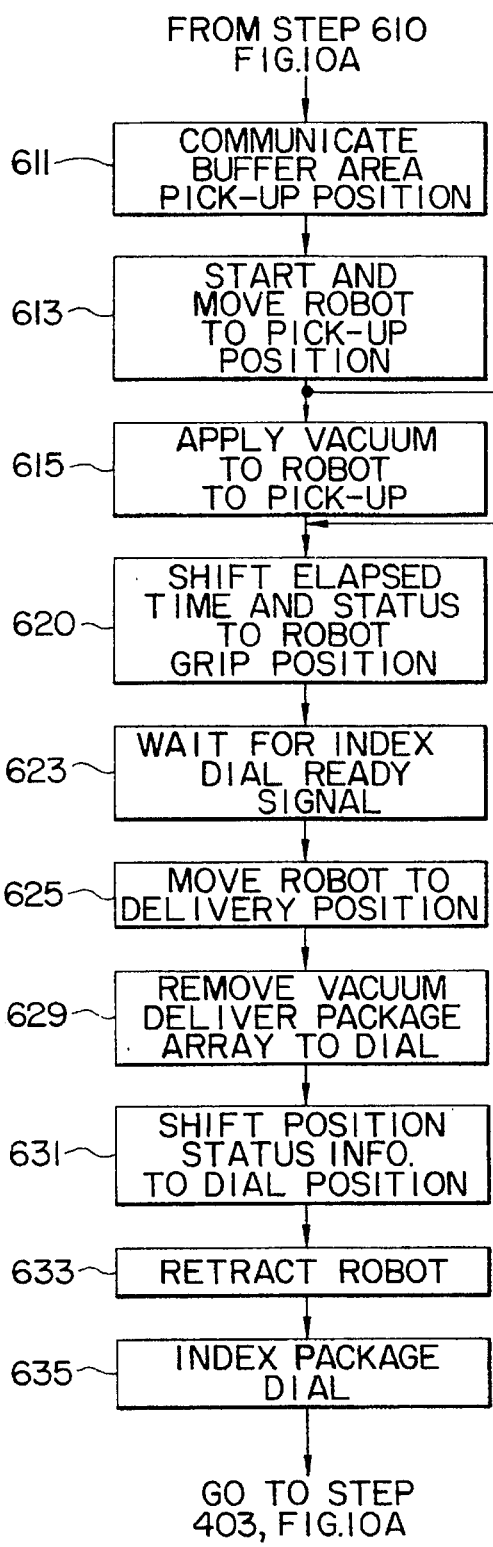
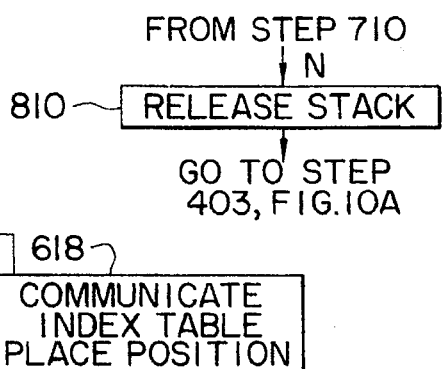
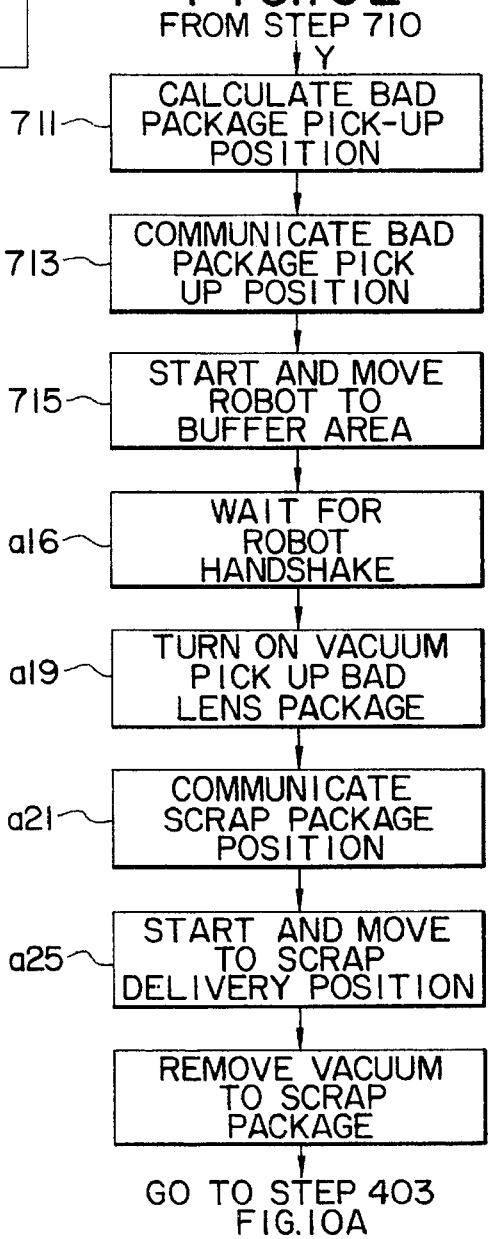

INTERACTIVE CONTROL SYSTEM FOR PACKAGING CONTROL OF CONTACT LENSES

FIELD OF THE INVENTION

This invention relates generally to a contact lens manufacturing facility for producing ophthalmic contact lenses, and, in particular to a control system for consolidating the serial flow of lens packages for packaging thereof.

DESCRIPTION OF THE PRIOR ART

The direct molding of hydrogel contact lenses is disclosed in U.S. Pat. Nos. 4,495,313 to Larsen, 4,680,336 to Larsen et al., 4,565,348 to Larsen, and 4,640,489 to Larsen et al., the entire disclosures of which are hereby incorporated by reference in this patent application. Essentially, these references disclose an automated contact lens production process wherein each lens is formed by sandwiching a monomer in a mold cavity formed between back curve (upper) and front curve (lower) mold halves. The monomer is polymerized, thus forming a lens, which is then removed from the mold cavity and subject to further processing such as hydration, automatic lens inspection (ALI), and packaging for consumer use.

Prior art processes significantly reduce the thruput time by hydrating the lens and releasing the lens from the mold cavity with ionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

In view of the foregoing, it is necessary to remove the deionized water from the packages to enable the package to be filled with buffered saline solution. However, the final product is defective if the lenses remain dry for an extended period of time and if they experience high-speed movement causing dislocation of the lenses. Thus, the time that the de-ionized water is removed from the packages to the time that the packages are filled with a saline solution at a subsequent packaging station, must not exceed a predetermined time limit.

Therefore, it would be highly desirable to incorporate in a lens packaging station, a control means for tracking the elapsed time that individual lens packages or arrays of lens packages are maintained in a dry state after deionized water removal.

It would also be highly desirable to incorporate in a lens packaging station, a control means for tracking the position of each lens package or arrays of lens packages from a deionized water removal station to a lens packaging station in addition to tracking the elapsed dry-time status of each the lens package array.

SUMMARY OF THE INVENTION

It is an object of the present invention to provide a packaging control system for controlling the automatic, high-speed transport of products, such as contact lenses contained in a package, from an automatic product inspection station to a product indexing package dial.

It is a further object of the present invention to provide a packaging control system that tracks discrete arrays of products conveyed on a serial flow production line.

Another object of the present invention is to provide a packaging control system that calculates elapsed time and positional status information for each array of products transferred from a first station and conveyed to a second packaging station.

It is yet another object of the present invention to provide a packaging control system that incorporates means for rejecting individual units of each array of products when it is determined that the individual product is defective as determined by an automatic inspection system.

It is yet still a further object of the present invention to provide a means for consolidating random variations in product flow along a production line as individual units from each array are rejected as being defective.

Still yet another object of the present invention to provide a control means that enables the conveyance of packages in a first arrangement from a first location to a second location where the packages are picked-up in a second arrangement.

It is further an object of the present invention to provide a consolidation buffer between two serial production operations, wherein the number and arrangement of product varies between input and output. The present invention enables use of a first x,y array of product units merging from a serial production line, and consolidating those product units into a second x,y array of units which corresponds to an array used in second production operation relating to the product.

It is further an object of the present invention to provide a programmable logic controller which maintains a status count for each of the individual products in the consolidation buffers of the present invention, including a count for each random addition of product, and a separate count for each selection and transport of product from the buffers to the final packaging station.

Still, a further object of the present invention to provide a control means that enables the conveyance of packages in a 2×8 array of discrete packages from a first location to a second location where the packages are picked-up in a 2×5 array of discrete packages.

Yet still another object of the present invention is to provide a packaging control system having a control means that initiates specific product rejection when it is determined that the product has not been processed within a predetermined time parameter.

The above objects are achieved in an interactive control system for controlling the automatic packaging of contact lenses in a contact lens fabrication facility, the interactive control system comprising a first robot device for periodically transferring individual arrays of a first predetermined amount of discrete contact lens packages each containing a contact lens therein from a first station to an intermediate conveyor where said individual arrays are conveyed to a second station, and, controller for initiating a time stamp for each individual array transferred from said first station and determining elapsed time data for each individual array and for generating position status data indicating a good array or a bad array of defective lenses for each individual array as it is conveyed to said second station, said controller shifting said elapsed time data and position status data for each individual array as it is conveyed on said intermediate conveyor for transfer to said second station.

Further benefits and advantages of the invention will become apparent from a consideration of the following detailed description given with reference to the accompanying drawings, which specify and show preferred embodiments of the invention.

BRIEF DESCRIPTION OF THE DRAWINGS

The foregoing objects and advantages of the present invention for a contact lens production line pallet system may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 6 illustrates the PLC flow diagram for accomplishing DI-water removal at the deionized water removal station.

FIGS. 10(a)–10(f) illustrate the detailed PLC logic flow diagram for transferring packages containing contact lens to either the indexing rotary package dial, or, the consolidation buffer area.

DESCRIPTION OF THE PREFERRED EMBODIMENT

Figure 1:
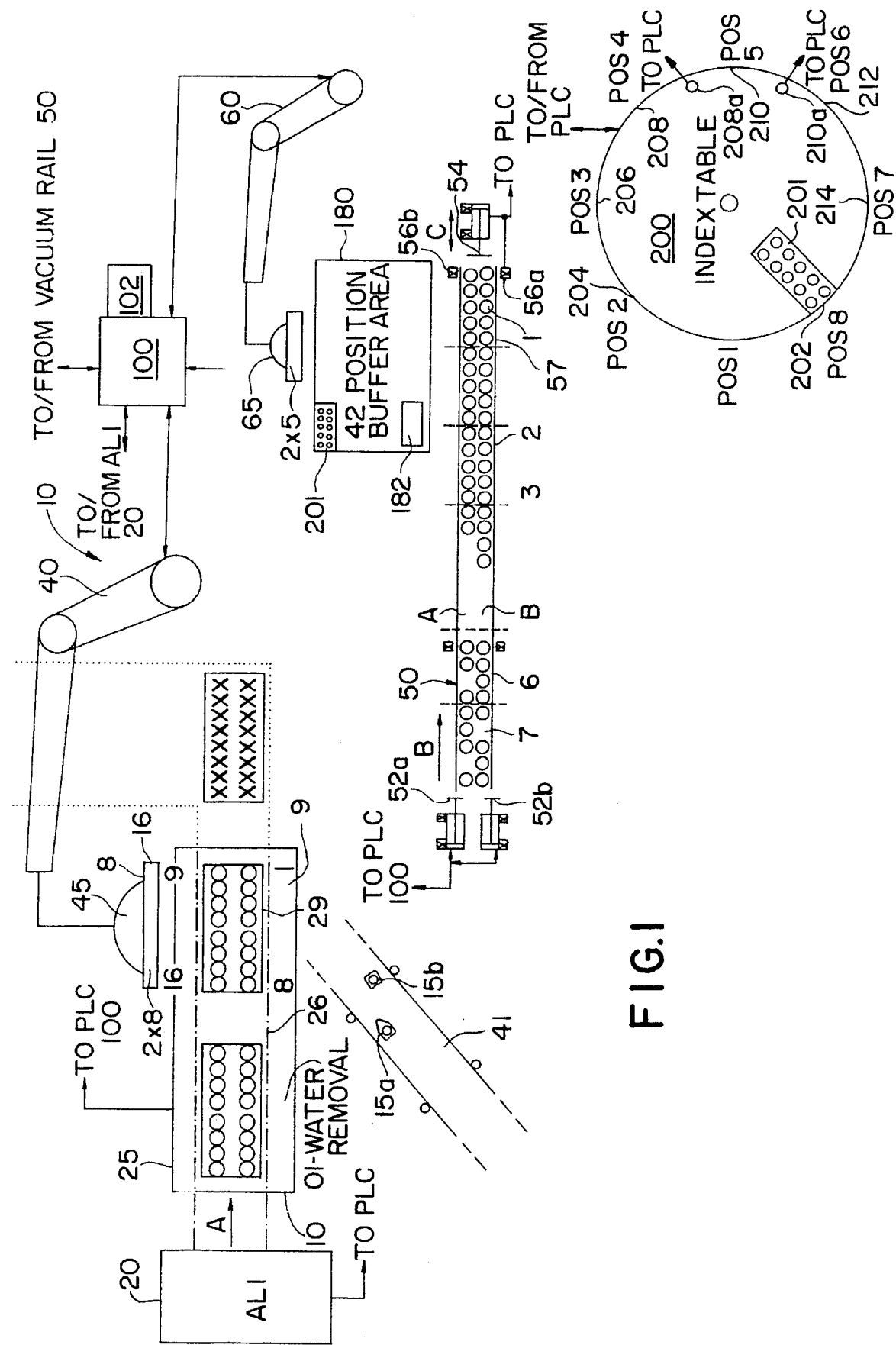
FIG. 1 is a simplified diagrammatic illustration of a contact lens package consolidation system incorporating the interactive packaging control system of the instant invention.

Referring to FIG. 1, there is shown a simplified diagrammatic view of the packaging system 10 implemented in a contact lens fabrication facility having an automatic lens inspection system and automated lens package consolidation system. The operational details of the lens package consolidation system 10 may be found in co-pending patent application U.S.S.N. entitled "Automated Apparatus and Method for Consolidating Products for Packaging" assigned to the same assignee as the instant invention, the disclosure of which is incorporated by reference herein.

The production of the contact lens itself is fully explained in co-pending patent application U.S.S.N. 08/258,654 entitled "Consolidated Contact Lens Molding" assigned to the same assignee as the instant invention. As described in the above-mentioned co-pending patent application U.S.S.N. 08/257,791, and, in further view of FIG. 4, arrays of soft contact lenses are transferred from a hydration station (not shown), after being subject to a hydration process, and placed in individual package bottoms (packages) loaded in an inspection pallet by a robotic apparatus 22 for conveyance through a post hydration automatic lens inspection (ALI) station 20, and, a DI water removal station 25 of the contact lens fabrication facility. The loaded pallet is first moved by a conveyor (not shown) to a deionized water injection station 16 wherein each of the packages transported on the inspection pallet are partially filled with degassed and deionized water. The inspection pallet is then transferred by a push conveyor to an overhead double index conveyor and then handled by a side grip conveyor as it conveyed through the ALI station. After deionized water removal and robotic device pick-up, the inspection pallet is subsequently returned to receive a new set of packages where the process is repeated.

Figure 2:
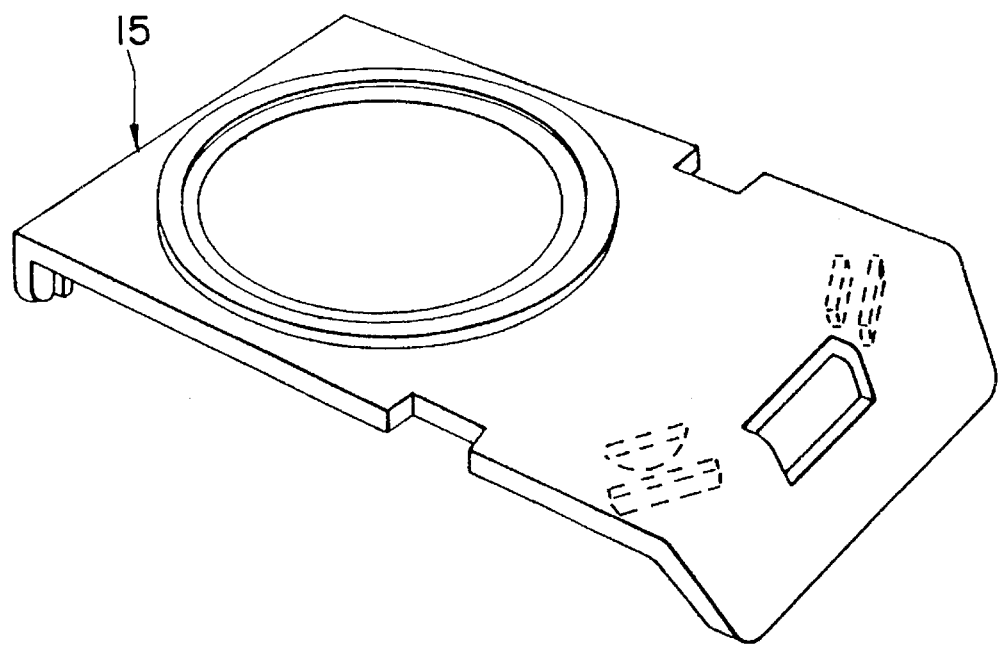
FIG. 2 is an isometric view of a contact lens carrier which serves as both an inspection carrier, and a portion of the final contact lens package.
Figure 3:
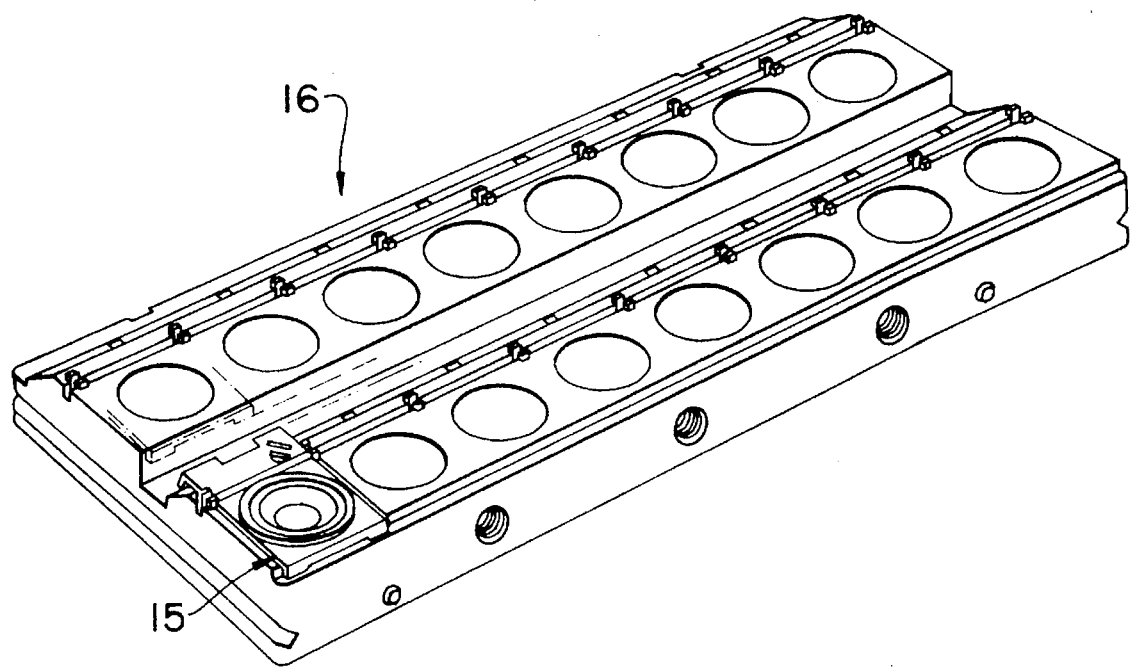
FIG. 3 is an isometric view of an inspection carrier used to transport a plurality of the contact lens carriers illustrated in FIG. 2 through the automated lens inspection station.

FIG. 2 illustrates the preferred embodiment of the lens package base 15 for carrying a contact lens, and, FIG. 3 illustrates the preferred embodiment of a lens inspection pallet 16 for carrying a predetermined number of the contact lens packages, one of which is shown in the pallet, throughout the automatic lens inspection (ALI) station and lens package consolidation station 10. The structural details of both lens package 15 and lens package pallet 16 are described in detail in the above-mentioned co-pending patent application patent application U.S.S.N. 08/257,791. As can be seen in FIG. 3, the lens package pallet 16 is capable of carrying up to sixteen (16) packages in a 2×8 array.

As shown generally in FIG. 1, the packaging control system 11 includes a control device 100 which may be a computer or one or more programmable logic controllers (PLC) and a corresponding memory device 102 for controlling the serial conveyance and robotic handling of packages from an automatic inspection station 20 to a packaging dial 200 where secondary packaging of the contact lens package is commenced. More specifically, the packaging control system functions to keep track of good lens/defective lens status information as determined at the ALI station 20; to control the deionized water removal for each lens package prior to conveyance to a packaging dial; to control robotic handling and transfer of lens packages from the deionized (DI) water removal station 25 to a consolidation vacuum rail or stack 50, including enabling rejection of specific lens packages containing defective lenses as determined at the ALI station; to consolidate the serial flow of lens packages on the stack 50 when particular packages have been rejected as containing defective lenses; to keep track of the time elapsed from deionized water removal to placement at a delivery location 202 on the packaging dial 202 for each lens package array; to control robotic handling of package arrays containing ten packages in a 2×5 array from the vacuum rail to a support pallet 201 indexed by the rotary indexing packaging dial 200 to ensure serial flow thereto; to control the storage and retrieval of lens package arrays from support pallets 201 located at a lens package buffer storage area 180 if a lens package array can not be placed on the support pallet at the indexing package dial, or, if the vacuum rail cannot supply packages to the dial when requested; and, to control specific lens packaging processes at a variety of process stations located about the rotary indexing package dial that include: a verification station 204 for verifying the presence and alignment of each package array base in the support pallet; a saline dosing station 206 that is provided with an array of dosers for depositing a given dosage of saline solution in each package; a saline level checking station 208; a final product check station to a foil receiving station 210, where a sheet of laminated covers is picked and placed over the array of package bases; a heat sealing station 212 wherein a heated seal head heat seals the laminated covers to each package base; and, an unloading radial station 214 where an unloader arm unloads the sealed packages from the rotary indexing package dial for subsequent processing.

In the preferred embodiment shown in FIG. 1, control means 100 constitutes a single PLC, and associated circuitry and software, for providing the tracking and serial flow of products. Preferably, the PLC is a TI system 545 (Texas Instruments). The PLC is programmed with Application Productivity Tool (APT) software. As shown in FIG. 1, a memory storage device 102 having adequate addressing and storage capabilities for the PLC 100 to access and process data in the form of elapsed dry-time information and positional status information, is provided. Specifically, the elapsed dry-time information indicates the time elapsed from deionized water removal of a particular lens package at the DI water removal station, to its placement on the packaging dial. If the elapsed time for any particular package is determined to be over a specific limit, then the lens package array containing that timed out lens package will subsequently be rejected by the second buffer robot. Elapsed dry-time information for each lens package array described hereinafter, is contained in the variable POS ARR[i], where index i=1, . . , 50, 60, 61, and 101 i.e., and STACK_ARR[j], where index j=1, 2 . . , 10 the major locations designated in this portion of the packaging system. In the preferred embodiment, elapsed dry-time data is shifted within these variables (16-bit registers) in memory 102 as each lens package array is conveyed to the different positions.

The positional status information for each lens package array represents the good/bad status of that package array throughout locations of the package consolidation station of the lens packaging station, and, particularly, the locations on the serial vacuum rail and buffer storage area. Positional status information for each lens package array described hereinafter, is represented as the variable POS_OCC[i], where the index i=1, . . , 50, i.e., and STACK_ARR[j], where the index j=1, 2, . . , 10, the major locations that a particular lens package array occupies. The values stored in this array may either be a "0", indicating that the particular location is not occupied by a lens package, a "1", indicating that the lens package at that array is good, or, a "2" indicating that the package array at that particular location contains a defective lens package due to elapsed dry time. As shown in FIG. 1, the indexes for the STACK_ARR[i] and STACK_OCC[i] arrays are indicated in brackets {} wherein: the position indicated as {10} represents the DI water removal location where time stamping is initiated; position {9} represents the package array pick-up point at the DI water removal conveyor 26 location; position {8} represents the good/bad robot tooling (gripper) location when the robot gripper 45 holds an array of packages; position {7} represents the package delivery point at the vacuum rail 50; positions {6}-{1} represent the locations on the vacuum rail 50 (stack) as lens packages are forwardly advanced and accumulate thereon for buffer robot pickup at transfer point 57; the positions represented by POS_ARR[i] and POS_OCC[i] arrays are the positions located in the buffer area and the rotary package dial 200. For instance, the position indicated as {50} in FIG. 1, represents the buffer robot tooling (gripper) location when the robot gripper 65 holds an array of packages for transfer. Other variables used in the packaging control system will become evident as discussed below.

DI Water Removal Station

As shown in FIG. 1, the contact lenses contained in their package bottoms in a deionized water solution are transported from the ALI station 20 in the direction of arrow "A" to a deionized water removal station 25 where the deionized water must be removed from the package to enable subsequent filling with buffered saline solution. Specifically, the DI water is removed to enable each package array to be swiftly transferred from serial flow out of the ALI station 20 to the vacuum rail 50, and, from the vacuum rail 50 to the buffer storage area 180, or, support pallet 201 on package dial 200. However, a contact lens will be considered defective if it remains dry for 14 minutes or longer. Thus, it is necessary that after DI water removal occurs, the PLC 100 initiate a time stamp to enable elapsed dry-time tracking in PLC memory.

Figure 4:
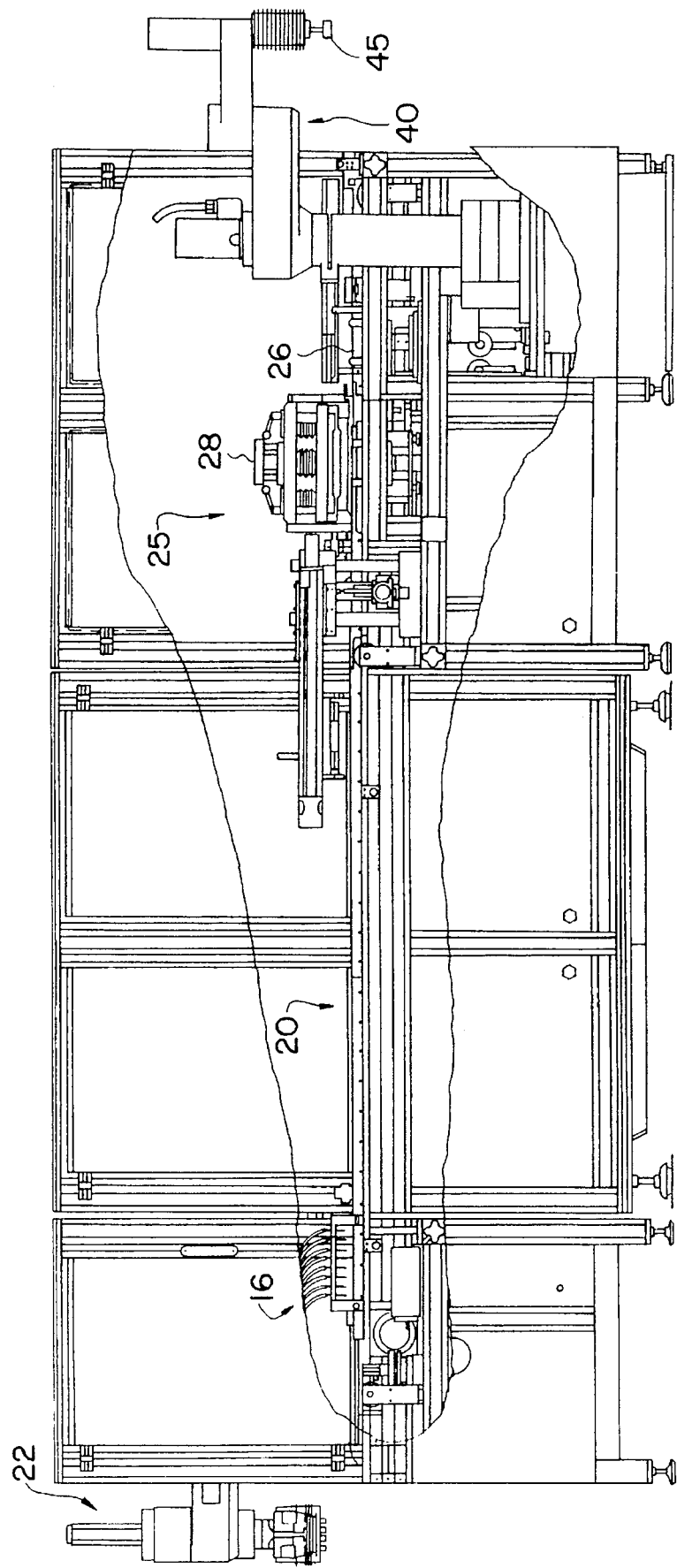
FIG. 4 is an elevation view of the automated lens inspection system and the stations utilized in the initial handling of the lenses prior to lens package consolidation.

As shown in FIG. 4 and the process flow chart of FIG. 6, DI-water removal is accomplished by a pressurized air cylinder 28 having individual nozzles (not shown) that are registered above each 2×8 pallet containing the array of lens packages. The nozzles are specially configured nozzles, such as described in U.S.S.N. 07/999,234, entitled "Solution Removal Nozzle", assigned to the same assignee as the instant invention and, the disclosure of which is incorporated by reference herein. After the air blow pressure check, indicated at step 71 in FIG. 6, the air blow cylinder is extended to a lower registered position, indicated at step 73, and the air blow is initiated at step 75. It is understood that the force and duration of the air blow upon the individual lens packages of the array is carefully controlled so as to not disrupt or remove the contact lens contained therein. Furthermore, the construction of the nozzle is such that a vacuum venturi effect is created so that the force of the compressed air enables the DI-water to evacuate the package without harming the lens. After the air blow is terminated at step 77, the air blow cylinder 28 is retracted to its upper position (not shown) as indicated at step 79. The final step indicated at step 81 is to initiate the elapsed time stamp information. As shown in FIG. 6 the following variables are initialized:
STACK_OCC[10]:=1;
STACK_ARR[10]:=1;

The value of "1" assigned to STACK_OCC[10] indicates that the position {10}, i.e., DI-water removal position is occupied with a pallet containing a package array of good lenses. The value of "1" assigned to STACK_ARR[10] indicates that the time stamp has been initiated. It should be understood that control means 100, as implemented by the PLC, includes a continuously running master clock (not shown) for real time tracking. The current time stamp information is stored as a variable TODS (time of day stamp). As a new time stamp is generated, the old TODS value is assigned to the variable OLD_TODS. The elapsed time, stored as variable ELAP_SEC is calculated as follows:

```
BEGIN
ELAP_SEC    :=ROUND(TODS-OLD_TODS);
OLD_TODS    :=TODS;
END
```

This is a free-running math text that is run continuously so that elapsed time and positional values will always be updated. The maximum dry time exposure that is acceptable is stored in the variable DRY_TIME and is about 14 minutes.

Transfer of Package Array to Robot Pick-Up Point

After deionized water removal from the lens packages, the package array is conveyed along DI-water removal conveyor 26 to the first Robot pick-up point where the individual packages 15 containing contact lenses are to be removed from the pallet 16 by a good/bad robot 40 (Robot 1) having a robot gripper 45 with independently actuable vacuum grippers which engage the packages at the pick-up point. The pallet 16 containing the 2×8 array of lens packages is conveyed to the robot 40 pick up point 29 as indicated in FIG. 1, and the positional status and elapsed dry time status information is transferred to the positional status array for the Robot 1 pick-up point indicated as position {9} in FIG. 1. Thus, the information from the previous position (DI-water removal position {10}) stored in STACK_OCC [10] and the elapsed dry-time since DI-water removal stored in STACK_ARR[10] is assigned to the respective variables representing the new position STACK_OCC[9], STACK_ARR[9], respectively. Specifically,
STACK_OCC[9]:=STACK_ARR[10];
STACK_ARR[9]:=STACK_ARR[10];

The elapsed time and positional information for the DI-water removal position {10} is re-initialized for the new process to occur at that position. Thus, STACK_OCC[10]:=0, indicates that there is an unoccupied position at location {10}. Additionally, STACK_ARR[10]:=0, indicates that there is no time stamp information at the position {10}. The elapsed time that is transferred between the STACK_ARR [i] registers as the package arrays are transported through the system is calculated as above.

Transfer of Package Array from Robot to Vacuum Rail

Once the pallet carrying the 2×8 array of lens packages is at the robot pickup position, the PLC commands the robot to pick up all 16 individual lens packages from the array.

Figure 5:
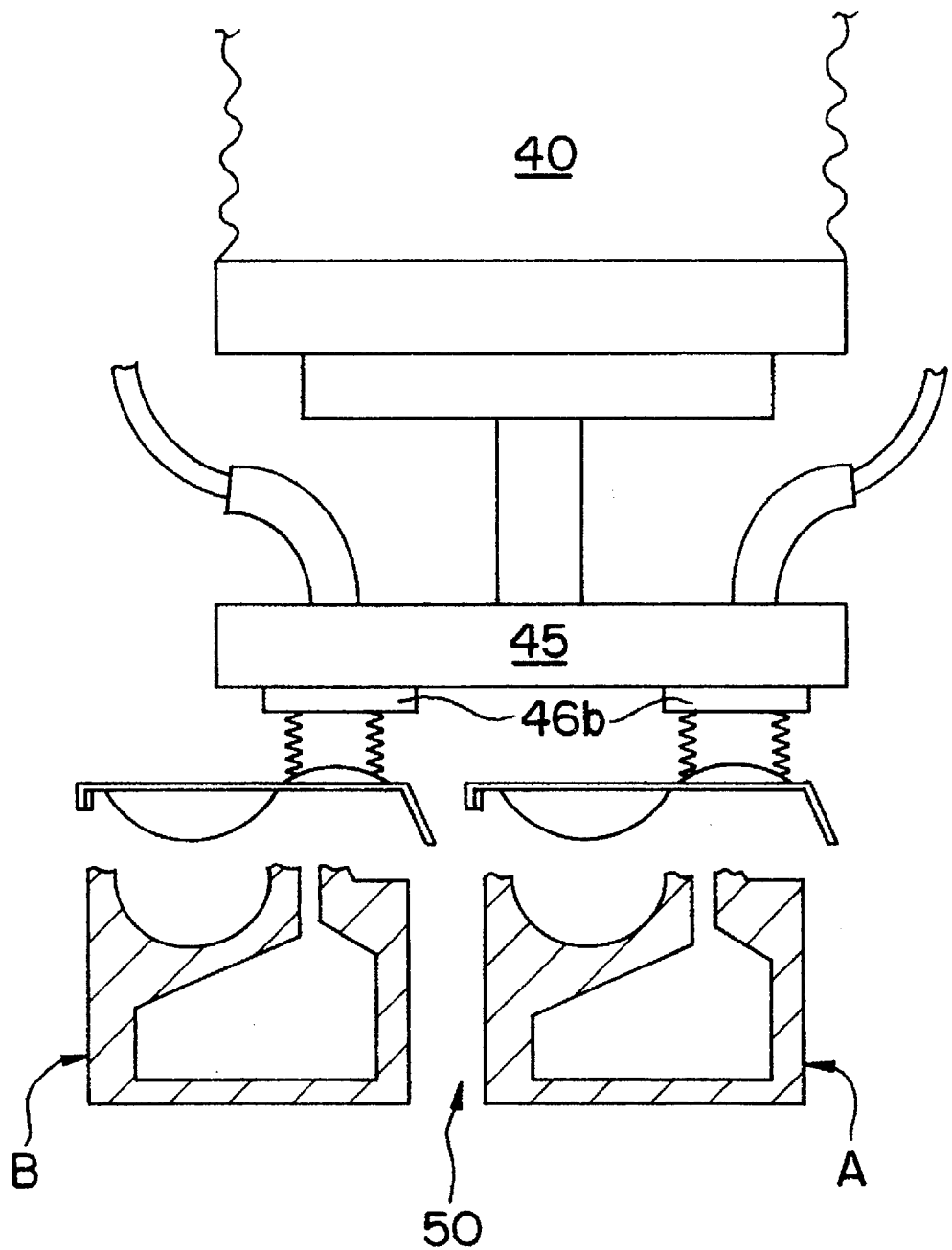
FIG. 5 illustrates in detail an individual robotic handling device transporting contact lens carriers to the consolidation vacuum rail of the present invention.
Figure 11:
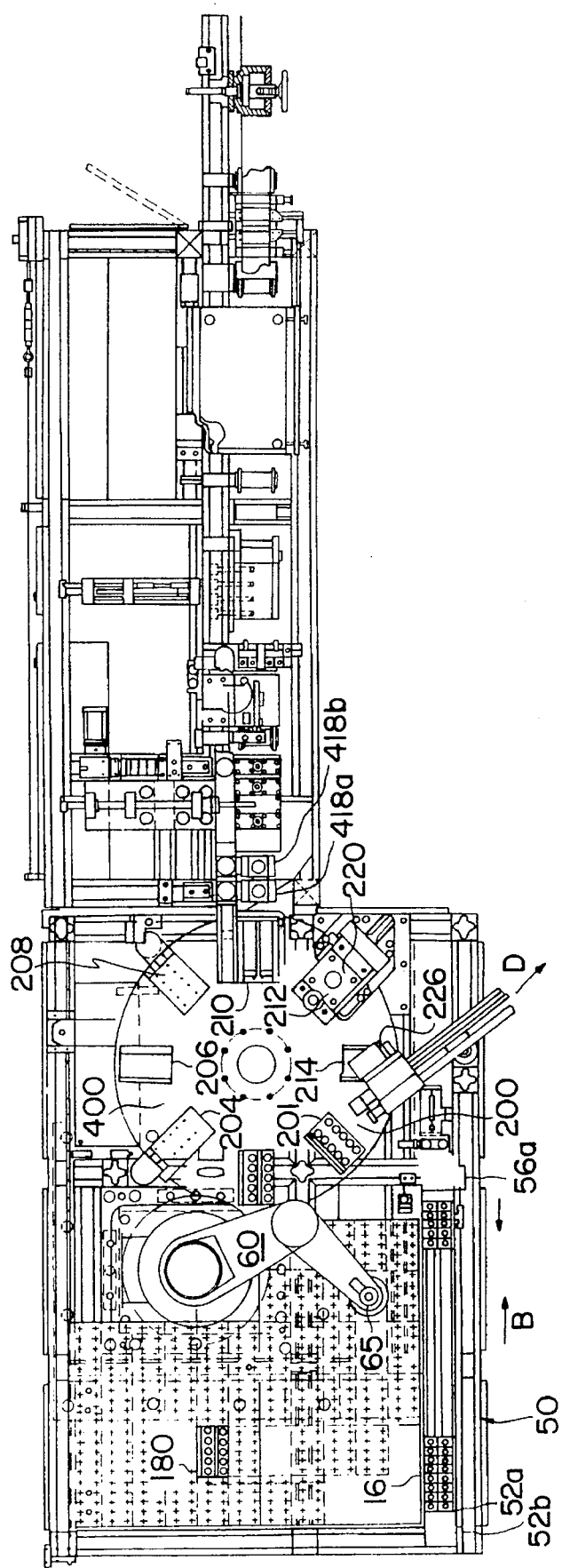
FIG. 11 illustrates a plan view of the rotary indexing package dial 200 and the stations thereat for processing the contact lens packages after consolidation.

As described above and in greater detail in the above-mentioned co-pending patent application U.S.S.N. 08/257,791 incorporated by reference herein, the vacuum gripper 45 of robot apparatus 40 comprises two side rows 46(a) and 46(b), of eight (8) individuated vacuum gripper nozzles each, that are enabled to pick up to sixteen lens packages at a time (in a 2×8 array) from the package pallet 16 and place up to eight (8) lens packages onto each respective vacuum rail A and B of vacuum rail 50, the cross-section of which is illustrated in FIG. 5. As described in greater detail below, if any or some of the lenses are defective as determined at the ALI vision inspection system, then the PLC will command the Robot 40 to reject those specific packages 15(a), (b) containing defective lenses, and place them onto reject conveyor 41 as shown in FIG. 1. Immediately thereafter, the robot 40 transfers the remaining lens packages on the vacuum rail stack 50, for conveyance to the packaging dial 200. Thus, in each cycle, there may be random empty locations on each vacuum rail A and B where a package would have been placed. The vacuum rails A and B thus, need to be consolidated and the empty locations filled in each cycle to enable the vacuum gripper 65 of buffer robot 60 to pick ten (10) lens packages in a 2×5 array from vacuum rail 50 and deposit them in a support pallet 201 located at a predetermined position 202 on a the package dial 200, or, in one of a plurality of buffer pallets 201 located at the lens package buffer area 180 as shown in FIG. 1 and 11. As explained below, it is desired to maintain the difference between the amount of lens packages placed on rails A and B of vacuum rail 50 to be within one (1) package.

Vacuum Rail Balancing and Consolidation

Figure 7A:
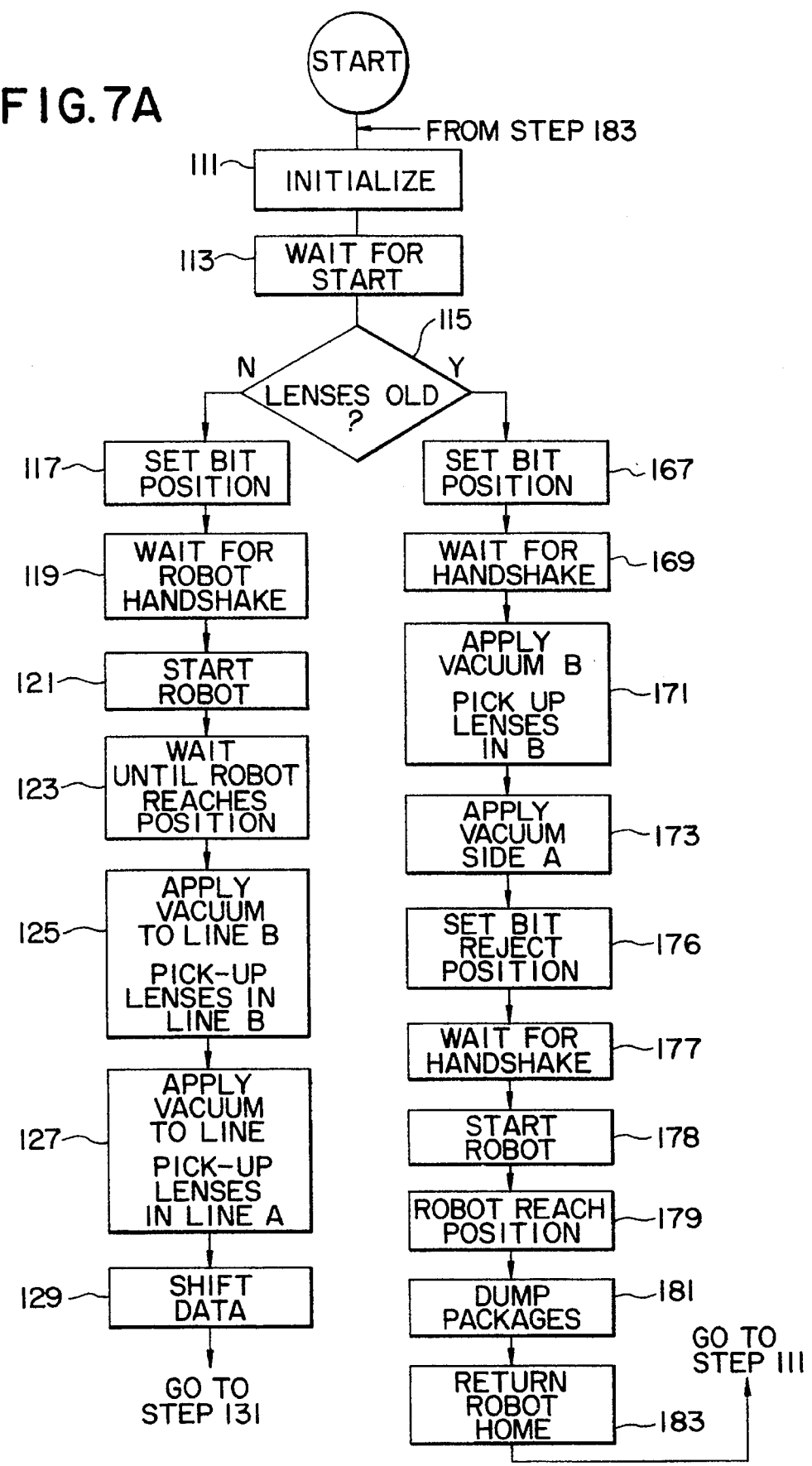
FIGS. 7(a), (b) and (c) illustrate the detailed PLC flow diagram for transferring packages from the DI-water removal conveyor to the vacuum rail stack, and for balancing the placement of good lens packages on the stack.

As shown in FIG. 7(a), an initialization step 111 initializes all software variables and math subroutines and disables all software interlocks for the PLC control. After a start signal is received at step 113, the PLC determines at step 115 whether any of the lenses at the robot pick-up point 29 are too old, i.e., if the current elapsed time STACK_ARR[9] is less (<) than the dry time-out limit DRY_TIME. If not, then the robot gripper 45 will pick up the lenses at the predetermined array pick-up point 29. Thus, at step 117, the coordinates of the pick-up position 29 at the DI_water removal conveyor 26 are communicated to the Robot 40 by the PLC. After receiving the robot handshake at step 119, the robot is commanded to move to the pick-up position at step 121. When the robot reaches the position at step 123, a vacuum is applied to nozzle side 46(b) (side B) of the robot gripper so that up to eight lenses may be picked up from the pallet, as shown at step 125 in FIG. 7(a). In the preferred embodiment, eight (8) packages are picked up at a time by the robot 40 for each nozzle side. At step 127, a vacuum is applied to nozzle side 46(a) of the robot gripper so that up to eight lenses may be picked up from the other row of packages from the package pallet. After all sixteen packages are picked up, and, as shown in FIG. 7(a) at step 129, the information from the previous position (package pick-up position {9}) stored in STACK_OCC[9] and the elapsed dry-time since DI-water removal stored in STACK_ARR[9] is shifted to the respective variables representing their new position held by the robot gripper, i.e., STACK_OCC[8], STACK_ARR[8], respectively. Specifically,
STACK_OCC[8]:=STACK_ARR[9];
STACK_ARR[8]:=STACK_ARR[9];

The elapsed time and positional information from the package pickup position {9} is re-initialized for the new process to occur at that position. Thus, STACK_OCC[9]:=0, indicates that there is an unoccupied position at location {9}. Additionally, STACK_ARR[9]:=0, indicates that there is no time stamp information at the location {9}.

After the robot move to pick-up the array, the previously determined pass/fail shift register data for the respective lenses in the package array is indexed for evaluation by the PLC which will make the determination as to whether any particular package is defective. This information is evaluated by the PLC and communicated to the robot if any lenses need to be rejected. The variables RO_STAT_A and RO_STAT_B are the variables for respective robot gripper sides 46(a) and 46(b) having values from 0 to 255 that indicate which specific lens or lenses are defective. The 16 bit register storing that variable will have a logic 0 in a specific bit location corresponding to a specific numbered location, i.e., 1 to 8 (gripper side A) and 9 through 16 (gripper side B) as illustrated in FIG. 1 to indicate that the lens carried by that specific gripper nozzle should be rejected. Thus a value equal to 255 indicates that all lenses are good. Any value less than that indicates that there exists a defective lens.

Figure 8A:
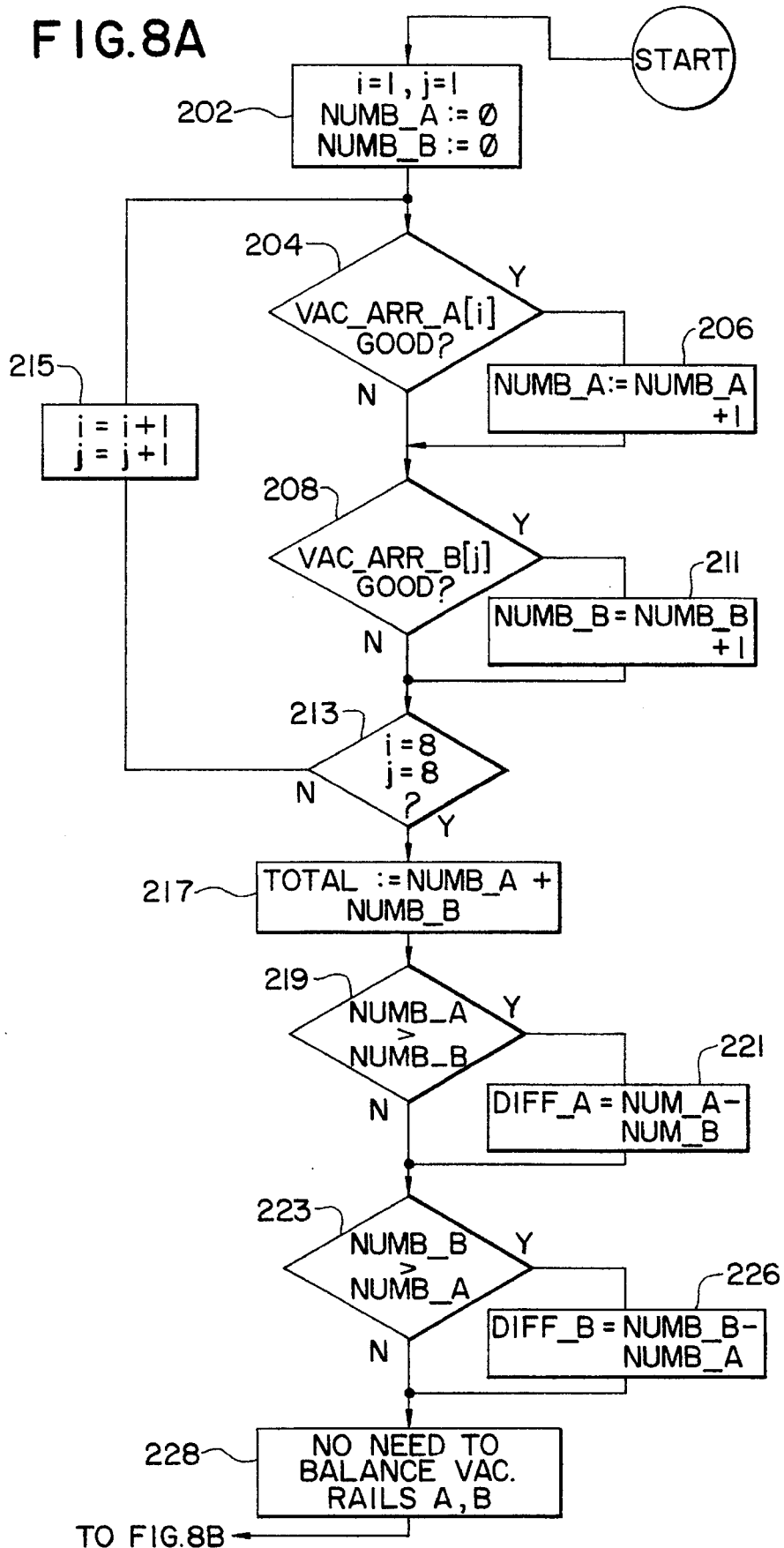
FIGS. 8(a) and 8(b) illustrate the detailed PLC flow diagram for calculating the total number of packages to be transferred from one rail of the stack to the other rail for accomplishing balancing.
Figure 8B:
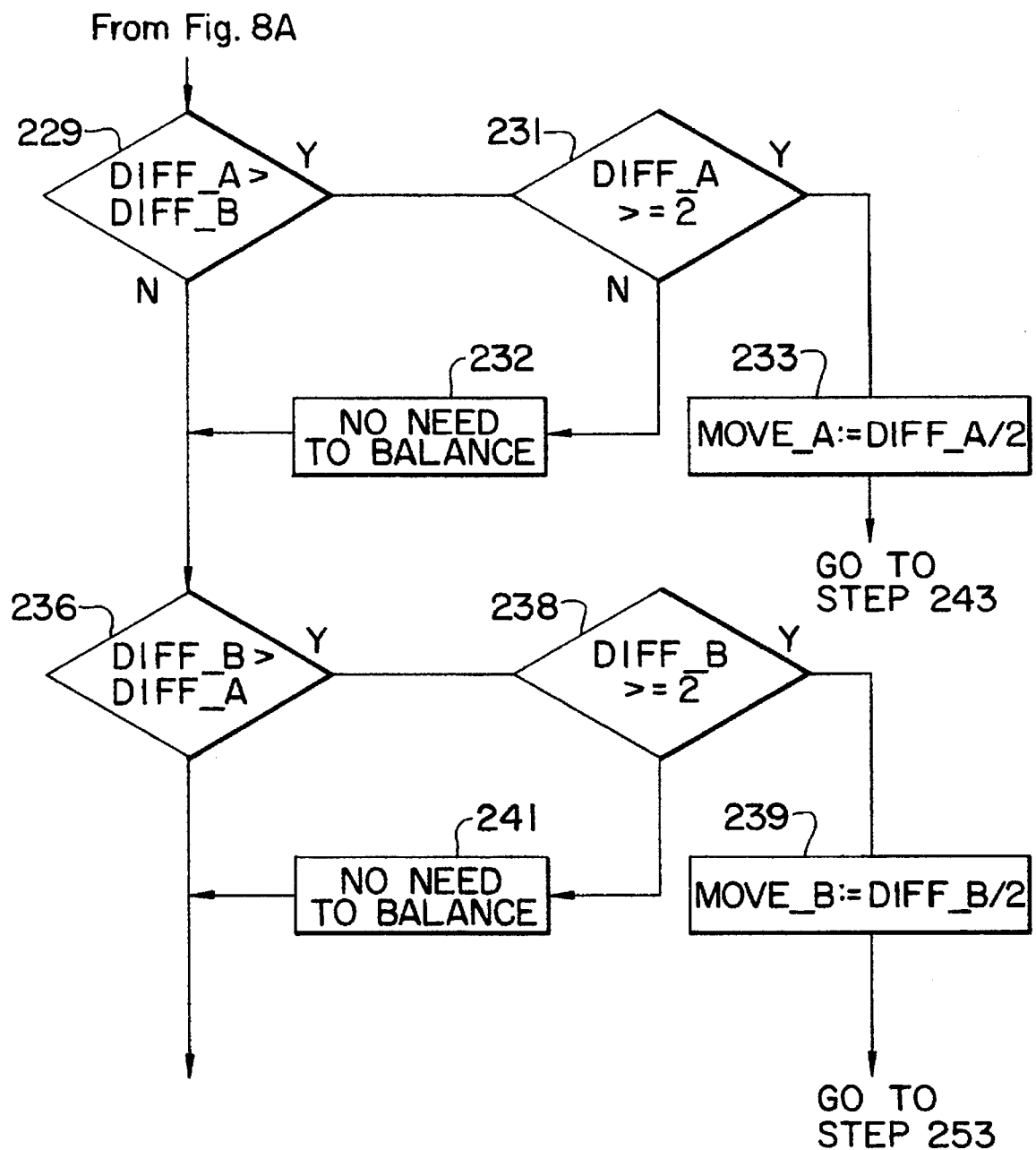

As shown in FIG. 7(b), the next function is to move the robot to the position above the idler conveyor 41 where lenses may be dropped if they are determined to be defective. Thus, at step 131, the coordinates of the idler conveyor position 41 are communicated to the Robot 1 by the PLC. After receiving the robot handshake at step 133, the robot is commanded to move to the package reject position at step 135. When the robot reaches the position at step 137, the PLC will determine if any of the lenses are defective at step 139, and, as indicated by the logic at step 139a. Thus, the logic:
RO_STAT_A<255
RO_STAT_B<255
is evaluated. If each relation is true, the robot will dump the individual defective lens packages from the respective nozzle gripper sides on to the idler conveyor 41 as indicated at step 142. If all the lenses for the particular array have failed ALI inspection, i.e., RO_STAT_A=0 and RO_STAT_B=0, as indicated at step 142a, then robot will return to its home position (step 11 of FIG. 7(a)) as indicated at step 143, and wait for a request to pick up a new package array at the package pick-up point; otherwise, there are still good lenses to be transferred to the vacuum rail 50. Specifically, the PLC first waits for a vacuum rail ready signal as indicated at step 145, and after it is received, the PLC communicates the coordinates of the vacuum rail stack delivery position, position {7}, as indicated at step 147 in FIG. 1, to the robot 40. After receiving the robot handshake at step 149, the robot is commanded to transfer the remaining good lens packages to the stack position at step 151. When the robot reaches the stack delivery position as indicated in FIG. 7(c) at step 153, the PLC will determine, at step 155, the difference between the number of lens packages that remain gripped by robot gripper side A and gripper side B to effect balancing of the placement of the packages onto the vacuum rail stack side A, B respectively, to within one package. FIGS. 8(a) and 8(b) illustrate the PLC programmed logic flow for balancing the vacuum rail stack 50.

The variable arrays VAC_ARR _A[i] and VAC_ARR _B[j], i=1, . . , 8, and j=1, . . , 8, are programmed to hold the RO_STAT_A and RO_STAT_B vacuum status information, respectively, of the robot vacuum gripper nozzles to determine the remaining good packages to be transferred from the robot gripper 45 of first robot assembly 40 to respective vacuum rail lines A and B. Specifically, each of the eight (8) locations of each array are tested to determine if the packages (i.e., lenses) carried by the robot gripper for each vacuum rail A, B are present, i.e., have not already been determined to be defective and selectively rejected by robot assembly 40 and disposed of at the reject conveyor 41. If the vacuum status for the specific position of a package held by the robot is activated, then the package will be placed on the corresponding rail array. A running total is kept for each package to be transferred to each vacuum rail A, B. From each total, it is thereafter readily determined how many packages need to be moved and to which side rail so as to maintain the vacuum rail A, B balance to within one (1) package.

As shown at step 202 in FIG. 8(a), the total count of good packages present for transfer to each vacuum rail is initialized at zero for each rail A, B. Specifically, the variable NUMB_A and NUMB_B are set equal to zero and the indexes i,j are each set equal to 1. The next series of steps checks the vacuum status information for each package held by the robot gripper to determine which packages the robot will transfer to each vacuum rail. Thus, at step 204, the vacuum status VAC_ARR _A[i] for each of the robot pick/place positions for rail A is checked for each iteration of index i. For each good package present, a tally of the total number of good packages NUMB_A to be transferred to each side rail A is calculated at step 206 for each iteration. At step 208, the vacuum status VAC_ARR_B[j] for each of the robot pick/place positions for rail B is checked for each iteration of index j. For each good package present, a tally of the total number of good packages NUMB_B to be transferred to each side rail B is calculated at step 211 for each iteration. A check is made at step 213 to determine if the vacuum status at all eight (8) positions for each vacuum rail A, B has been checked. If not, the indexes i and j are incremented at step 215 and the cycle is repeated for the next package positions of arrays VAC_ARR _A[i] and VAC_ARR _B[j] until all sixteen positions have been checked.

In the next step 217, a determination is made as to the total amount of lens packages to be transferred in the current cycle. This is a simple addition of the total number of transferable packages, NUMB_A +NUMB_B, and this value will subsequently be used as explained in greater detail below. Steps 219 and 221 of FIG. 8(a) comprise the logic to compare the values of NUMB_A and NUMB_B, respectively, and determine the difference DIFF_A, DIFF_B, respectively, between the total number of packages to be transferred on each respective side rail A, B. If NUMB_A >NUMB_B, then there are more packages to be transferred to rail A, and one or more of these packages, determined by the variable DIFF_A, will have to be transferred to vacuum rail B for balancing. Similarly, as shown in steps 223 and 226, if NUMB_B >NUMB_A, then there are more packages to be transferred to rail B, and one or more of these packages, determined by the variable DIFF_B, will have to be additionally transferred to vacuum rail A for balancing. If NUMB_B=NUMB_A, then an equal number of packages are to be transferred to each side rail, and balancing need not be performed as indicated at step 228.

Steps 229 through 239 include the logic for determining exactly the number of packages that are to be transferred from rail A to rail B, represented by the variable MOVE_A, or, from rail B to rail A, represented by the variable MOVE_B. Thus, if DIFF_A>DIFF_B as shown at step 229, and the value of DIFF_A>=2, as shown at step 231, then variable MOVE_A is calculated at step 233 as the value of the variable DIFF_A divided by two (2). Otherwise, there is no further need to balance, as indicated at step 232. As discussed below, it is next determined at steps 243 et seq. of FIG. 8(c) exactly which specific package will be transferred from vacuum rail A to a corresponding position on vacuum rail B. Therefore, if DIFF_B>DIFF_A as shown at step 236, and the value of DIFF_B>=2, as shown at step 238, then variable MOVE_B is calculated at step 239 as the value of the variable DIFF_B divided by two (2). Otherwise, there is no further need to balance, as indicated at step 241. A subsequent determination is made at steps 253, et seq. of FIG. 8(d), which specific package will be transferred from vacuum rail B to a corresponding position on vacuum rail A, as discussed below.

Figure 8C:
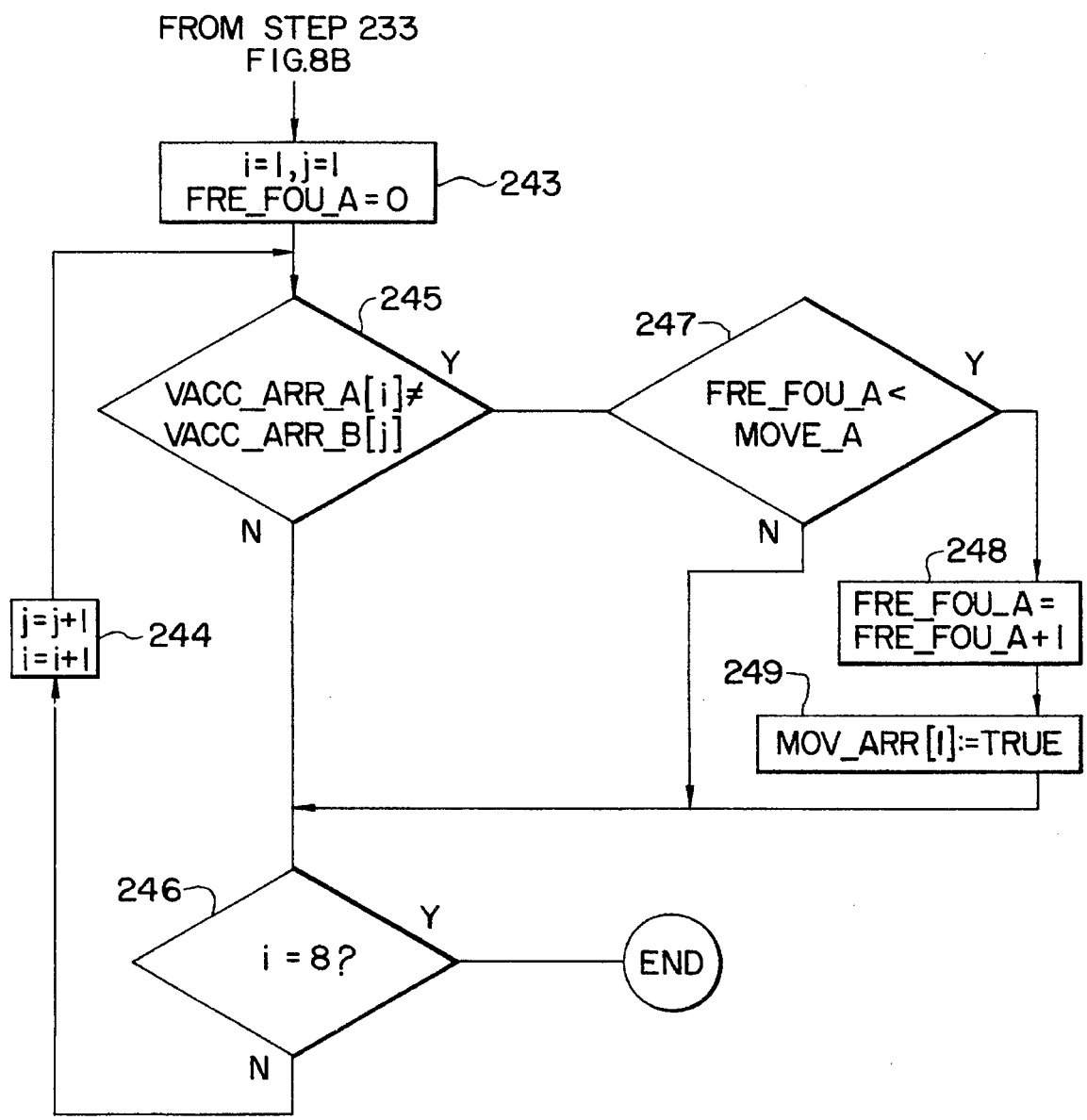
FIGS. 8(c) and 8(d) illustrate respective detailed PLC flow diagrams for determining which specific packages held by the robot gripper are to be transferred from vacuum rail A to B or vacuum rail B to A, respectively, for balancing.
Figure 8D:
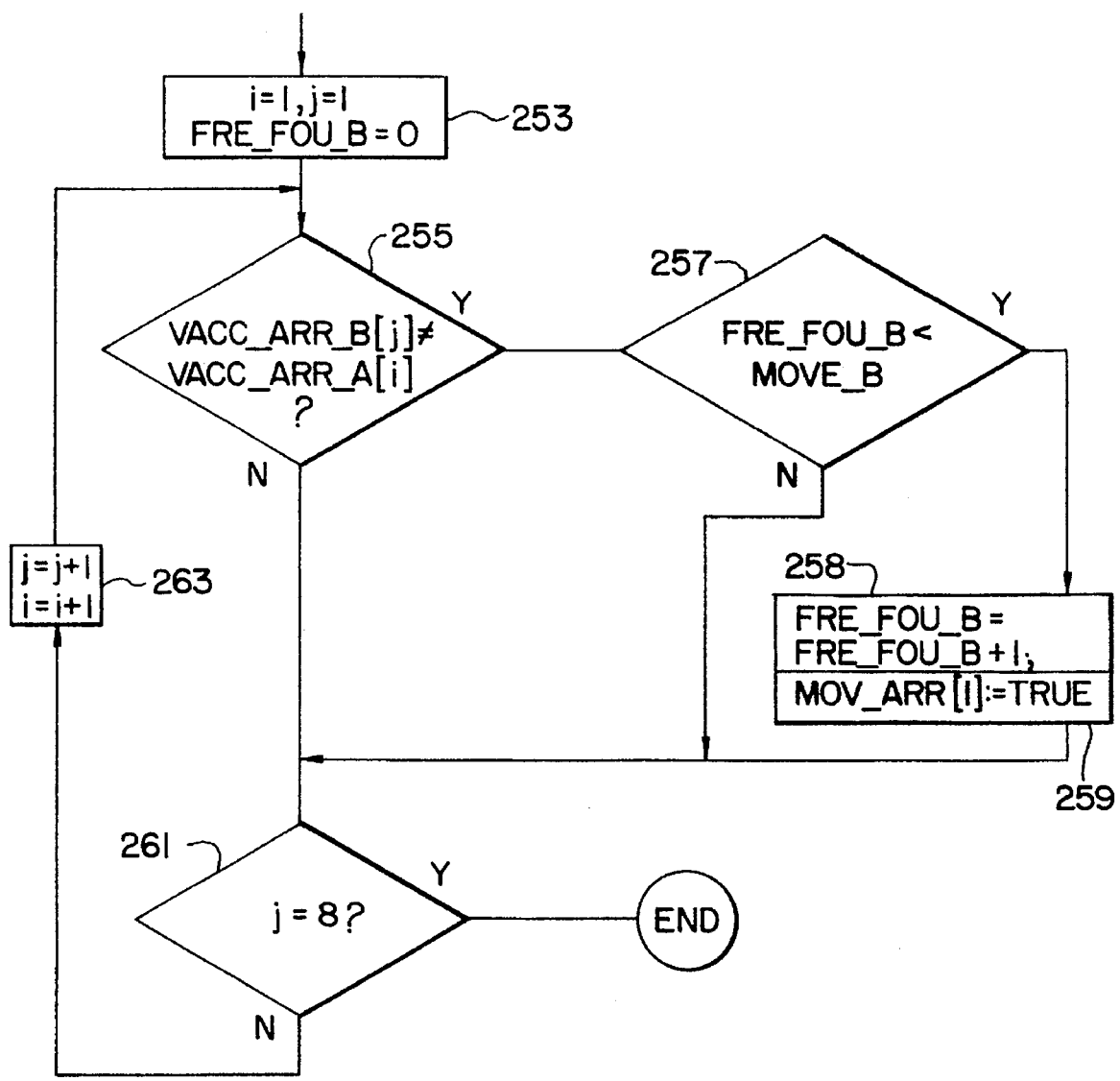

Once the determination is made as to the amount of packages that need to be transferred and to which vacuum rail A or B requires the packages, (stored in the variable MOVE_A or MOVE_B), a determination is made at step 157 in FIG. 7(c) as to which specific package is to be moved by the robot gripper 45 from one vacuum rail to the other. This is based upon which package positions are empty on the side requiring the additional packages. Steps 243 to 249 in FIG. 8(c) illustrate the sequence for determining which locations are free on vacuum rail B so that lens packages can be transferred from vacuum rail A. Array MOV_ARR_A [i], where i=1, . . , 8, is the array that is defined to indicate which actual package(s) held by the robot gripper 45 will be moved. Alternately, steps 253 to 259 in FIG. 8(d) illustrate the sequence for determining which locations are empty (free) on vacuum rail A so that lens packages can be transferred from vacuum rail B. Array MOV_ARR_B[j], where j=1, . . , 8, is the array that is defined to indicate which actual package(s) held by the robot 45 gripper will be moved. It is understood that the robot 40 does not physically remove packages from line A to line B, but retains those packages by individual vacuum nozzle grip at positions corresponding to locations where those packages would be placed on line vacuum rail A, so that they may be subsequently transferred instead to determined free positions on rail B in a subsequent movement. Likewise, the robot 40 does not physically remove packages from line B to line A, but retains those packages by vacuum nozzle grip at positions corresponding to locations where those packages would be placed on line vacuum rail B, so that they may be subsequently transferred instead to determined free positions on rail A in a subsequent movement.

As shown at step 243 in FIG. 8(c), the pointer FRE_FOU_A, which indicates the number of empty (free) locations in vac. rail line B, is initialized as equal to zero (0). Additionally, indexes i and j are set equal to one (1). Array VAC_ARR _A[i] i=1, . . , 8, represent the good package locations, i.e., those locations where the packages carried by the robot gripper in vacuum nozzle gripper row A can be placed onto corresponding vacuum rail A. Each position in array VAC_ARR _B[j], where j=1, . . , 8, represent the previously determined filled (not free) package locations.

The following steps 243 through 249 in FIG. 8(c) illustrate the logic for determining which selected packages will be placed from vacuum rail A, to vacuum rail B to fill the empty positions and maintain the balance of placed lens packages to within one on each vacuum rail. Specifically, at step 245, the status of a package location on vacuum rail A indicated by array VAC_ARR _A[i] is compared to the corresponding location on vacuum rail B indicated by array VAC_ARR _B[j] to determine if a package present on rail A can be moved to a corresponding free position on rail B by the robot gripper. Another check is made at step 247 to ensure that the current value of FRE_FOU_A is less than the total number of packages that have to be moved, i.e., FRE_FOU_A <MOV_A. If the above conditions are met, then at step 248, the current value of FRE_FOU_A is incremented by one (1), and a true condition is assigned to the position MOV_ARR[1] at step 249 to indicate that particular package is to be transferred to vacuum rail B. A check is made at step 246 to determine if all eight (8) transfer positions for transfer of specific packages from rail A to rail B have been checked. If not, the indexes i and j are incremented at step 244 and the cycle is repeated for the next package positions of arrays VAC_ARR _A[i] and VAC_ARR _B[j] until all eight positions have been checked.

The PLC then determines at step 159 of FIG. 7(c) as to whether lenses are to be moved from vacuum rail A to vacuum rail B. If this is the case, then at step 161 the appropriate coordinates are input to the robot 40 by the PLC. The robot is then commanded to start the package transfer at step 163.

As shown at step 253 in FIG. 8(d), the pointer FRE_FOU_B, which indicates the number of empty (free) locations in vac. rail line A, is initialized as equal to zero (0). Additionally, indexes i and j are set equal to one (1). Array VAC_ARR _B[j] j=1, . . , 8, represent the good package locations, i.e., those locations where the packages carried by the robot gripper in gripper row B were placed onto corresponding vacuum rail B, and that have not been selectively disposed of as containing defective lenses. Each position in array VAC_ARR _A[i], i=1, . . , 8, represent the previously determined filled (not free) package locations.

The following steps 255 through 263 in FIG. 8(d) illustrate the sequence for moving selected packages, intended to be placed on vacuum rail B, to vacuum rail A to fill the empty positions and maintain the balance of placed lens packages to within one on each vacuum rail. Specifically, at step 255, the status of a package location on vacuum rail B indicated by array VAC_ARR _B[j] is compared to the corresponding location on vacuum rail A indicated by array VAC_ARR _A[i] to determine if a package present on rail B can be moved to rail A by the robot gripper. Another check is made at step 257 to ensure that the current value of FRE_FOU_B is less than the total number of packages that have to be moved, i.e., FRE_FOU_B <MOV_B. If the above conditions are met, then at step 258, the current value of FRE_FOU_B is incremented by one (1), and a true condition is assigned to the position MOV_ARR[1] at step 259 to indicate that that particular package is to be transferred to vacuum rail A. A check is made at step 261 to determine if all eight (8) transfer positions for transfer of specific packages from rail A to rail B have been checked. If not, the indexes i and j are incremented at step 263 and the cycle is repeated for the next package positions of arrays VAC_ARR _A[i] and VAC_ARR _B[j] until all eight positions have been checked. A determination is then made at step 159 of FIG. 7(c) as to whether lenses are to be moved from vacuum rail B to vacuum rail A. If this is the case, then at step 162 the appropriate coordinates are input to the robot 40 from the PLC. The robot is then commanded to start the package transfer at step 163.

After the lens packages have been transferred to the empty locations on vacuum rail by robot gripper, as indicated as step 163 in FIG. 7(c), the information from the previous position (robot gripper position {8}) stored in STACK_OCC[8] and the elapsed dry-time since DI-water removal stored in STACK_ARR[8] is shifted to the respective variables representing their new position on the stack i.e., STACK_OCC[7], STACK_ARR[7], respectively. Specifically, at step 165 in FIG. 7(c).
STACK_OCC[7]:=STACK_ARR[8];
STACK_ARR[7]:=STACK_ARR[8];

The elapsed time and positional information from robot tooling position {8} is re-initialized for the new process to occur at that position. Thus, STACK_OCC[8]:=0, indicates that there is an unoccupied position at location {8}. Additionally, STACK_ARR[8]:=0, indicates that there is no time stamp information at the location {8}.

If the current elapsed time STACK_ARR[9] is greater (>) than the dry time-out limit DRY_TIME, as determined at step 115 in FIG. 7(a), then the robot gripper 45 will pick up the lenses at the predetermined pick-up position 29 and reject all of the lenses immediately on to the reject (idler) conveyor 41. Thus, at step 167, the coordinates of the pick-up position 29 at the DI_water conveyor 26 are stored within Robot 40 and request pick-up position 29 is communicated to the Robot 40 by the PLC. After receiving the robot handshake at step 169, the robot is commanded to move to the pick-up position. When the robot reaches the position, a vacuum is applied to side B of the robot gripper nozzles so that they may pick-up packages from the first row of the pallet array, as shown at step 171 in FIG. 7(a). Since, sixteen (16) packages in a 2×8 array are picked up at a time by the robot 40, a vacuum is then applied to side A of the robot gripper nozzles so that lenses may be picked up from the other row of packages from the package pallet. This is indicated at step 173. Since these packages have been determined to be old, the next step 176 is to communicate to the robot 40 the coordinates for movement to the reject position. After receiving the robot handshake at step 177, the robot is commanded to move to the package reject position at step 178. When the robot reaches the position at step 179, the PLC will command the robot to dump the packages as indicated at step 181. Finally, the robot is commanded to move to a home position at step 183, and is returned to step 111 to begin the pick-up and place sequence for the next cycle.

Vacuum Rail Consolidation

After lens packages are balanced on respective sides A, B of the vacuum rail stack 50, consolidation takes place. A pair of independently advanceable pneumatic stacking cylinders 52(a), 52(b), shown interfaced with the PLC in FIG. 1, are extended in the direction of arrow "B" to advance the placed packages from their present positions on respective vacuum rails A, B (stack) and consolidate them at the buffer robot 40 (pick-up) point 57 located at the end of the stack. Besides ensuring efficient automatic serial product flow, consolidation is necessary to ensure that the robot gripper 65 of the second robot (buffer) assembly 60 will pick up a 2×5 array of lens packages at each machine cycle, or, perform a different function depending upon the respective status of the stack, the buffer storage area, and, the indexing package dial. Operational details of the cylinders 52(a),52(b) are described in further detail in the above-mentioned co-pending patent application U.S.S.N. 08/257,791.

Figure 9:
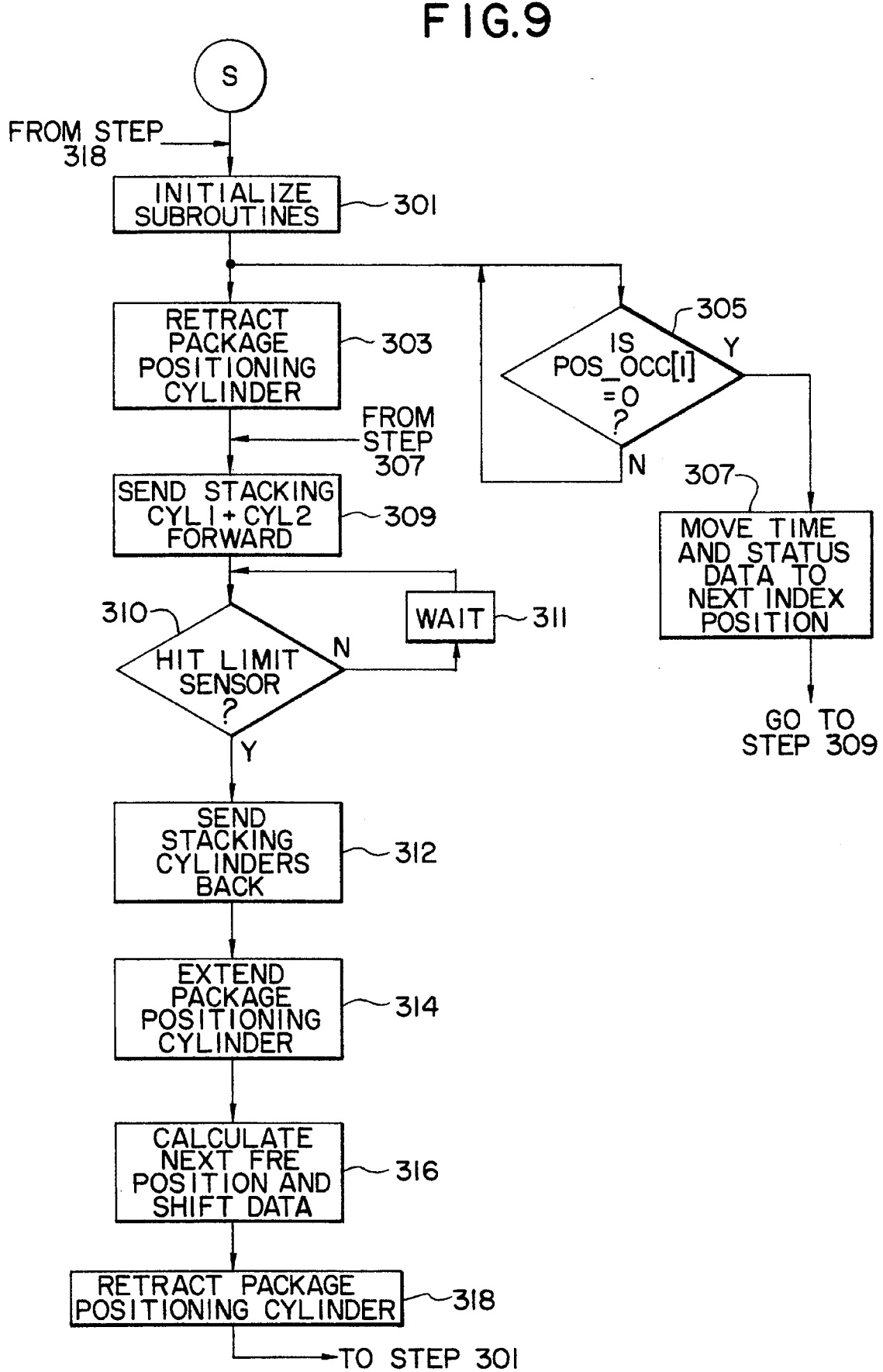
FIG. 9 illustrates the detailed PLC flow diagram for controlling package lens consolidation on the vacuum rail stack of the packaging station.

FIG. 9 illustrates the PLC logic employed for controlling the vacuum rail consolidation aspect of the packaging station, and, further, the logic for shifting elapsed dry time status information and positional information for each lens package array as it is advanced along the vacuum rail. The first step 301, is to initialize all subroutines including the routine for determining the next free position on the stack, i.e., positions {7} through {1} as shown in FIG. 1, and the routine for moving the time and positional data to the next free position. Thus, at step 305, a decision is made as to whether the first position 57 on stack 50 is empty or free which would indicate that robot 60 has just picked a 2×5 array from the stack and the stack is full. Each and every position on the stack will be considered free because the stacking cylinders will advance each lens package array on the stack to the next free position on the stack. Thus, if position {1} is unoccupied and there is no elapsed dry time status information for position {1}, i.e., if STACK_OCC[1]=0; then then each elapsed dry time status and positional status data for each location on the stack is shifted to the next free location, as indicated at step 307, i.e., STACK_ARR[1]:=STACK_ARR[2];
STACK_OCC[1]:=STACK_OCC[2];
STACK_ARR[2]:=STACK_ARR[3];
STACK_OCC[2]:=STACK_OCC[3];
STACK_ARR[3]:=STACK_ARR[4];
STACK_OCC[3]:=STACK_OCC[4];
STACK_ARR[4]:=STACK_ARR[5];
STACK_OCC[4]:=STACK_OCC[5];
STACK_ARR[5]:=STACK_ARR[6];
STACK_OCC[5]:=STACK_OCC[6];
STACK_ARR[6]:=STACK_ARR[7];
STACK_OCC[6]:=STACK_OCC[7];

Concurrently, at step 303, the package positioning cylinder 54, which is extensible in the directions indicated by arrow "C" as shown in FIG. 1 to align package arrays at a fixed reference location so that the robot 60 may pick up the package array, is retracted from its extended position. Then, at step 309, the stacking cylinders 52(a),(b) are commanded to extend forward in the direction of arrow B in FIG. 1 along the rail until the string of lens packages or the stacking cylinders themselves trigger either of the limit sensors 56(a),(b) at step 310. Until the packages or a stacking cylinder triggers the limit sensors 56(a),(b), the system is in a wait mode as indicated at step 311. After the limit sensor is triggered, the PLC enables the stacking cylinders to retract to their original positions beyond the package delivery point (position {7} shown in FIG. 1) as shown at step 312 in FIG. 9(a). Next, the packaging position cylinder is extended in the direction of arrow "C" in FIG. 1 and indicated at step 314 to align the lens packages present at the fixed reference position {1} so that the second robot 60 may pick up the array from that position.

After the positioning cylinder is extended, the elapsed dry-time and positional status information from the package array positions on the stack must be advanced in accordance with their new locations on the stack. For e.g., the packages that were present on the stack at position {7} (package placement position) may be advanced by the stacking cylinders to position {1}, or {3}, or {6}, for e.g., depending upon the amount of packages already placed on the stack. Thus, the next step 316 is to shift the elapsed time and status data accordingly to that stack position. To find that position and shift the data, the following logic is employed:

---

IF LENS_IN_STAC > 0 AND LENS_IN_STAC < 10
    THEN NEXT_STAC:=1;
ENDIF;
IF LENS_IN_STAC > 10 AND LENS_IN_STAC < 20
    THEN NEXT_STAC:=2;
ENDIF;
IF LENS_IN_STAC > 20 AND LENS_IN_STAC < 30
    THEN NEXT_STAC:=3;
ENDIF;
IF LENS_IN_STAC > 30 AND LENS_IN_STAC < 40
    THEN NEXT_STAC:=4;
ENDIF;
IF LENS_IN_STAC > 40 AND LENS_IN_STAC < 50
    THEN NEXT_STAC:=5;
ENDIF;
IF LENS_IN_STAC > 50 AND LENS_IN_STAC < 60
    THEN NEXT_STAC:=6;
ENDIF;
IF LENS_IN_STAC > 60 AND LENS_IN_STAC < 70
    THEN NEXT_STAC:=7;
ENDIF;

---

As will be explained in greater detail below, the variable LENS_IN_STAC represents the current total amount of lens packages in the stack at any one time. The variable NEXT_STAC represents the next free stack position as determined. Therefore, as indicated in the same step, data is shifted from the package placement position {7} to the new position depending upon the current size of the stack. i.e.,

```
IF NEXT_STAC >= 1 AND STACK_OCC[1] = 0 THEN
    STACK_OCC[1]:=STACK_OCC[7];
    STACK_ARR[1]:=STACK_ARR[7];
ENDIF;
IF NEXT_STAC >= 2 AND STACK_OCC[2] = 0 THEN
    STACK_OCC[2]:=STACK_OCC[7];
    STACK_ARR[2]:=STACK_ARR[7];
ENDIF;
IF NEXT_STAC >= 3 AND STACK_OCC[3] = 0 THEN
    STACK_OCC[3]:=STACK_OCC[7];
    STACK_ARR[3]:=STACK_ARR[7];
ENDIF;
IF NEXT_STAC >= 4 AND STACK_OCC[4] = 0 THEN
    STACK_OCC[4]:=STACK_OCC[7];
    STACK_ARR[4]:=STACK_ARR[7];
ENDIF;
IF NEXT_STAC >= 5 AND STACK_OCC[5] = 0 THEN
    STACK_OCC[5]:=STACK_OCC[7];
    STACK_ARR[5]:=STACK_ARR[7];
ENDIF;
IF NEXT_STAC >= 6 AND STACK_OCC[6] = 0 THEN
    STACK_OCC[6]:=STACK_OCC[7];
    STACK_ARR[6]:=STACK_ARR[7];
ELSE
    STACK_OCC[6]:=0;
    STACK_ARR[6]:=0;
ENDIF;
IF NEXT_STAC >= 7 AND STACK_OCC[7] = 0 THEN
    STACK_OCC[7]:=STACK_OCC[7];
    STACK_ARR[7]:=STACK_ARR[7];
ELSE
    STACK_OCC[7]:=0;
    STACK_ARR[7]:=0;
ENDIF;
```

Note that the elapsed time and positional information from vacuum rail stack positions {7} will be reinitialized for the new process to occur at that position. Thus, STACK_OCC[7]:=0, indicates that there is an unoccupied position, due to consolidation, at location {7}. Additionally, STACK_ARR[7]:=0, indicates that there is no time stamp information at the location {7}.

Concurrent with or immediately after the next free position is calculated and the data is shifted, the packaging position cylinder is retracted at step 318 to align the lens packages present at position {1} so that the second buffer robot 60 may now pick a package array from that position.

Vacuum Rail to Package Dial or Buffer Delivery

Depending upon the status of the stack, i.e., the amount of lens packages at a first position thereof, and the status of the package index dial, and, the amount of lens packages buffer storage area, the robot gripper 65 of buffer robot 60 will pick up a 2×5 array of packages from position 57 of the vacuum rails A, B, (stack), and, depending upon the status condition of the lens packaging dial 200, will either place the packages on a support pallet positioned on the package dial, or, will place the packages in one of fifty pallets 201 located at the buffer storage area 180 where the packages will be interimly stored until the package dial is ready to receive the array.

As illustrated in the flow diagram of FIGS. 10(a)–(f), this determination is made by the PLC control system.

Figures 2, 10A:
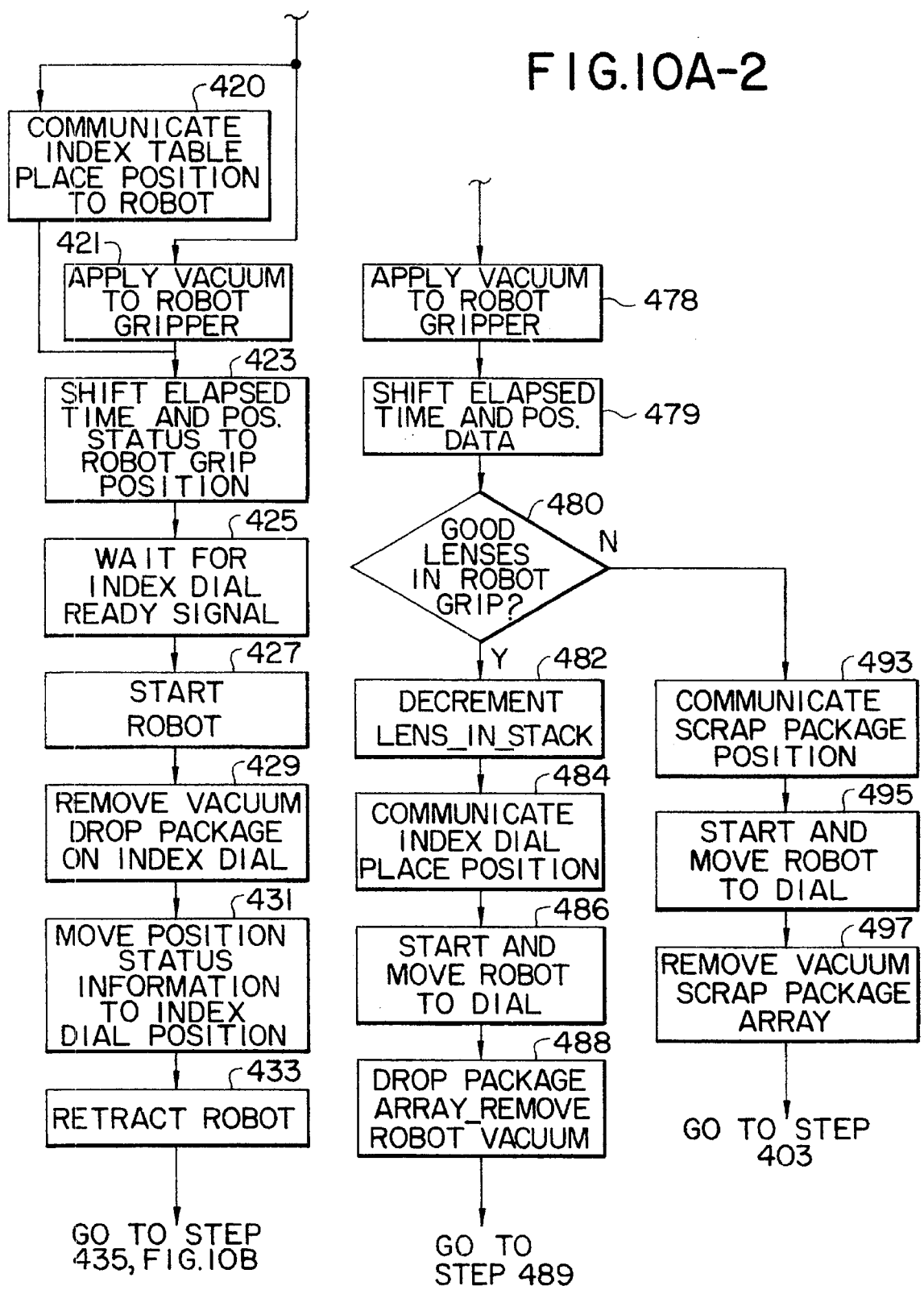

In FIG. 10(a), step 403 initializes software (math) subroutines and disables emergency stops (E-stops). If the lens package consolidation system is just starting up, the PLC initiates the robot pick and place sequences at step f3 and communicates the robot buffer robot home position, and buffer storage area good lens package pick-up position and, buffer storage area delivery positions, as indicated at step 403 in FIG. 10(a). As part of the process for calculating the position in the buffer storage area where the robot could pick up a good lens package, a loop is executed where the PLC checks each buffer location CHK_POS to find a "1" in POS_OCC[CHK_POS] indicating a good lens package. When a one is found and this position is older than the oldest so far, i.e., the elapsed time POS_ARR[CHK_POS] is greater than the current oldest elapsed time, then the current POS_OCC[CHK_POS] will be declared the oldest. In the process for calculating a good delivery position for the robot, a loop is executed where the PLC checks the status of each buffer storage location (POS_OCC[CHK_POS]) to find a "0" in POS_OCC. A "0" indicates that the buffer position is free. When a zero is found, this position is assigned as the delivery position "DEL_POS". The subroutine is exited and a good lens package delivery position is ready to be communicated to the robot 60 at step 403.

If the robot is not in an automatic run mode as determined at step 404, then the robot is commanded to go to a safe position at step 405 and the robot will be placed in a wait mode until the system is ready to run.

In steady state, after lens package consolidation, the PLC control system will determine the status of the vacuum rail stack, the buffer storage area 180, and, in addition, check the status of the package dial 200 and the elapsed dry-time status up to this point of the package consolidation sequence, before enabling the buffer robot 60 to pick and place lens packages onto the package dial. As shown at step 410 in FIG. 10(a), the PLC will first determine whether: the amount of packages at the buffer robot pickup point on the vacuum rails A, B is sufficient for the buffer robot to pick an array, whether the package index dial 200 is ready to receive the array from the vacuum rail stack, and, whether all software interlocks on the package dial are safe. If the above criteria are met, the PLC will make an additional determination as to whether good lens packages are present in the buffer storage area as shown at step 411.

If lens packages are present in the buffer area as indicated at step 411, the PLC will communicate the good package pick-up position, as indicated by the variable G_PICK_POS, from one of the 42 positions in the buffer storage area, as indicated previously at step 403, and communicates the good package pick-up position to the buffer robot at step 414 which provide hand shaking at step 416. At step 417, the PLC initiates a start signal to enable the robot gripper to move to the buffer area lens package pick-up position and the robot will handshake an acknowledge signal at step 419.

Steps 420 and 421 are next concurrently executed to prepare the robot for package pick-up. Specifically, step 421 initiates handshaking between the PLC and the robot to enable vacuum to be supplied to the buffer robot gripper. At step 420, the PLC communicates the coordinates for the place position 8 at the package index table. At the following step 423, the elapsed dry time status and position information for the picked array of lens packages is moved from the buffer pick position represented in array POS_ARR[G_PICK_POS] to the robot tooling position which is always represented as array position 50, i.e., POS_ARR[50]. Note that the status is also put into position, i.e., POS_OCC[50] :=POS_OCC[G_PICK_POS]. The timer and status information for the previously occupied good pick position POS_ARR[G_PtCK_POS], POS_OCC[G_PICK_POS], respectively, is then re-initialized as containing no data (:=0).

The buffer robot is now ready to place the array of lens packages to position 8 of the index dial 200 and at step 425 it waits until the index dial is ready. Once the PLC determines that the index dial is ready, the start signal is given to the robot to execute the transfer of the package array to the package index dial at step 427 and the PLC waits for the robot gripper to reach its registered position. Next the vacuum for the robot gripper is turned off at step 439 and the package array is placed at the desired position on the index dial. At step 431, the position status information is transferred from the robot tooling position POS_OCC[50] to the index dial position 8, represented as IDX_OCC[8], which now retains the 2×5 array of lens packages. The data contained in the robot tooling position POS_ARR[50], POS_OCC[50] is reinitialized as containing no data. After the robot has dropped off the packages, the PLC commands the robot to retract from its position as indicated at step 433.

Figure 10B:
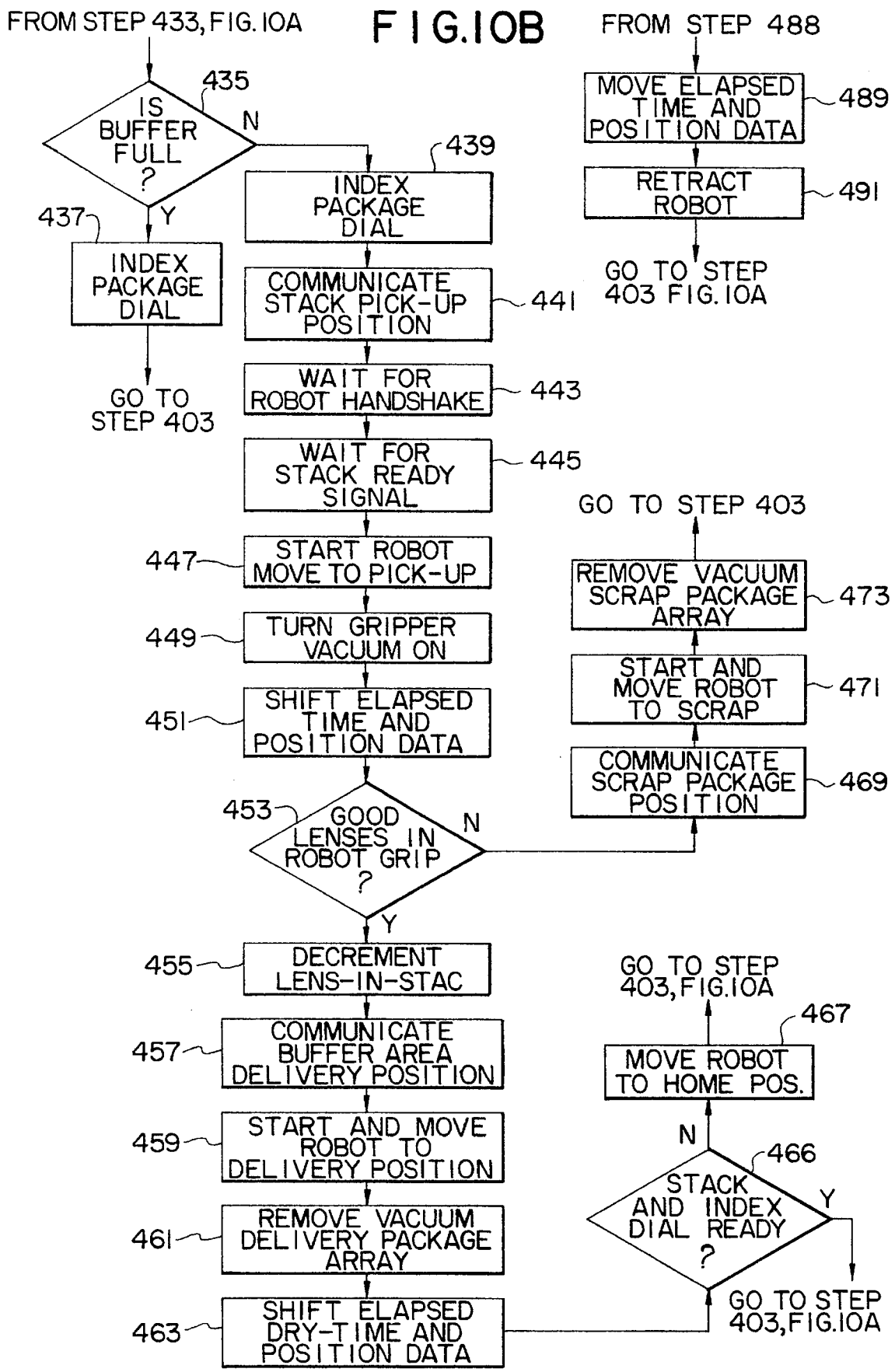

In FIG. 10(b) at step 435, a decision is made as to whether the buffer storage area is full lens package arrays or contains at least one lens package array. If the buffer area is full the process continues and at step 437, the package index dial is indexed to advance the package array to its next indexing position. If the buffer area contains at least one package array but is not full, the process continues and at step 439, the package index dial is released to advance to its next indexing position. Concurrently therewith, at step 441, the coordinates of the first pick-up position {1} on the stack (vacuum rails A, B), as illustrated in FIG. 1, are communicated by the PLC to the buffer robot. The robot responds by moving into the robot received position at step 443. At step 445, the PLC waits for the stack ready signal indicating there is an array of lens packages waiting to be picked up by the robot. After receiving this signal, the robot is handshaked and receives a start signal at step 447 to move into the stack pick up position. When the robot reaches that position, the vacuum for the robot gripper is turned on at step 449. At step 451, the elapsed dry-time information is shifted from the first position {1} of the vacuum rail, STACK_ARR[1], to the robot tooling position, POS_ARR[50]. Additionally, the lens package status information is shifted from the first position of the vacuum rail, STACK_OCC[1], to the robot tooling position, POS_OCC[50]. The time and status information for the first stack position STACK_ARR[1], STACK_OCC[1], respectively, is then re-initialized to a no data state.

Given the time and status data, the PLC determines if the lenses in the stack are good at step 453. If it is determined that the lenses are good, then the variable representing the total amount of lens packages in the stack, LENS_IN_STAC, is decremented by ten (10) at step 455. Next, the PLC commands the robot to move the lens package array from the first stack position {1} to a location in the buffer storage area 180. Thus, at step 457, the coordinates for the previously determined buffer delivery (place) position is communicated by the PLC to the buffer robot. After receiving the coordinates, the robot is handshaked and receives a start signal at step 459 to move into the stack pick up position. When the robot reaches that position and after appropriate handshaking, the vacuum for the robot gripper is turned off at step 461 and the packages are delivered to the buffer storage area. At step 463 the elapsed dry-time information for the picked array of lens packages is shifted from the robot tooling position POS_ARR[50] to the buffer delivery (place) position represented in array POS_ARR[DEL_POS]. Note that the elapsed dry time status information is also shifted accordingly, i.e., POS_OCC[DEL_POS] :=POS_OCC [50]. The dry time and status information for the previously occupied robot tooling positions POS_ARR[50], POS_OCC[50], respectively, are reinitialized as containing no data. Next, at step 466 a determination is made as to whether the stack and the package index dial is or will soon be ready and robot is to be placed in its wait or "home" position. If so, the coordinates for the robot home position are communicated to the robot and the start signal for moving the robot to its home position is given at step 467. If it is determined at step 466 that the vacuum rail stack is ready to have a package array removed therefrom, and that the package index dial is ready to be serviced, then the process will start all over again at step 403 and the position variables and software interlocks are disabled.

If it is determined that the lens packages at the first stack position were bad, then the PLC commands the robot to move the lens package array from the first stack position to a predetermined scrap location 182 (POS_OCC[60]) in the buffer storage area 180 as shown symbolically in FIG. 1. Thus, at step 469, the coordinates for the scrap delivery position is communicated by the PLC to the buffer robot. After receiving the coordinates, the robot is handshaked and receives a start signal at step 471 to move to the scrap delivery position. At step 473, the vacuum for the robot gripper is subsequently removed and the array of packages containing timed out lenses are scrapped at the scrap delivery position. The sequence is ready to begin again as indicated at step 403.

If lens packages are not present in the buffer area as determined at step 411, the PLC will communicate the coordinates of the stack pick-up position {1} to the buffer robot at step 472 in FIG. 10(a). The robot responds by moving into the robot received position at step 475 and additionally the PLC waits for the stack ready signal indicating there is an array of lens packages waiting to be picked up by the robot. After receiving this signal, the robot is handshaked and receives a start signal at step 476 to move into the stack pick up position. When the robot reaches that position, the vacuum for the robot gripper is turned on at step 477. At step 478, the elapsed dry-time status information is shifted from the first position {1} of the vacuum rail 50, STACK_ARR[1], to the robot tooling position, POS_ARR [50]. Additionally, the lens package positional status is shifted from the first position of the vacuum rail, STACK_OCC[1], to the robot tooling position, POS_OCC[50]. The time and status information for the first stack position STACK_ARR[1], STACK_OCC[1], respectively, are then re-initialized to a no data state.

Given the time and status data, the PLC determines if the lenses in the stack were good at step 480. If it is determined that the lenses are good, then the variable representing the total amount of lens packages in the stack LENS_IN_STAC is decremented by ten (10) at step 482. Next, the PLC commands the robot to pick-up and transfer the lens package array from the first stack position to the index package dial delivery position. Thus, at step 484, the coordinates for the package index dial place position is communicated by the PLC to the buffer robot. After receiving the coordinates, the robot handshakes and then receives a start signal at step 486 to move into the package dial delivery position. When the robot reaches that position, the vacuum for the robot gripper is turned off at step 488 and the package array containing good lenses are delivered to the package dial 200. At step 489 in FIG. 10(b), the elapsed dry-time information is transferred from the robot tooling position POS_OCC[50] to the index dial position 8, represented as IDX_OCC[8], which now retains the 2×5 array of lens packages. The data contained in the robot tooling position POS_ARR[50], POS_OCC[50] is reinitialized as containing no data. The robot is then retracted at step 491 and the steady state cycle is repeated.

If it is determined at step 480 that the lens packages at the first stack position are bad, then the PLC commands the robot to move the lens package array from the first stack position to a predetermined scrap location 182 (POS_OCC [60]) in the buffer storage area 180. Thus, at step 493, the coordinates for the scrap delivery position is communicated by the PLC to the buffer robot. After receiving the coordinates, the robot is handshaked and receives a start signal at step 495 to move to the scrap delivery position. At step 497, after the robot gripper has moved to the scrap delivery position, the vacuum for the robot gripper is removed, and the array of packages containing timed out lenses are scrapped. The sequence is ready to begin again as indicated at step 403.

Stack Ready, Deliver Package to Buffer Area

Figure 10C:
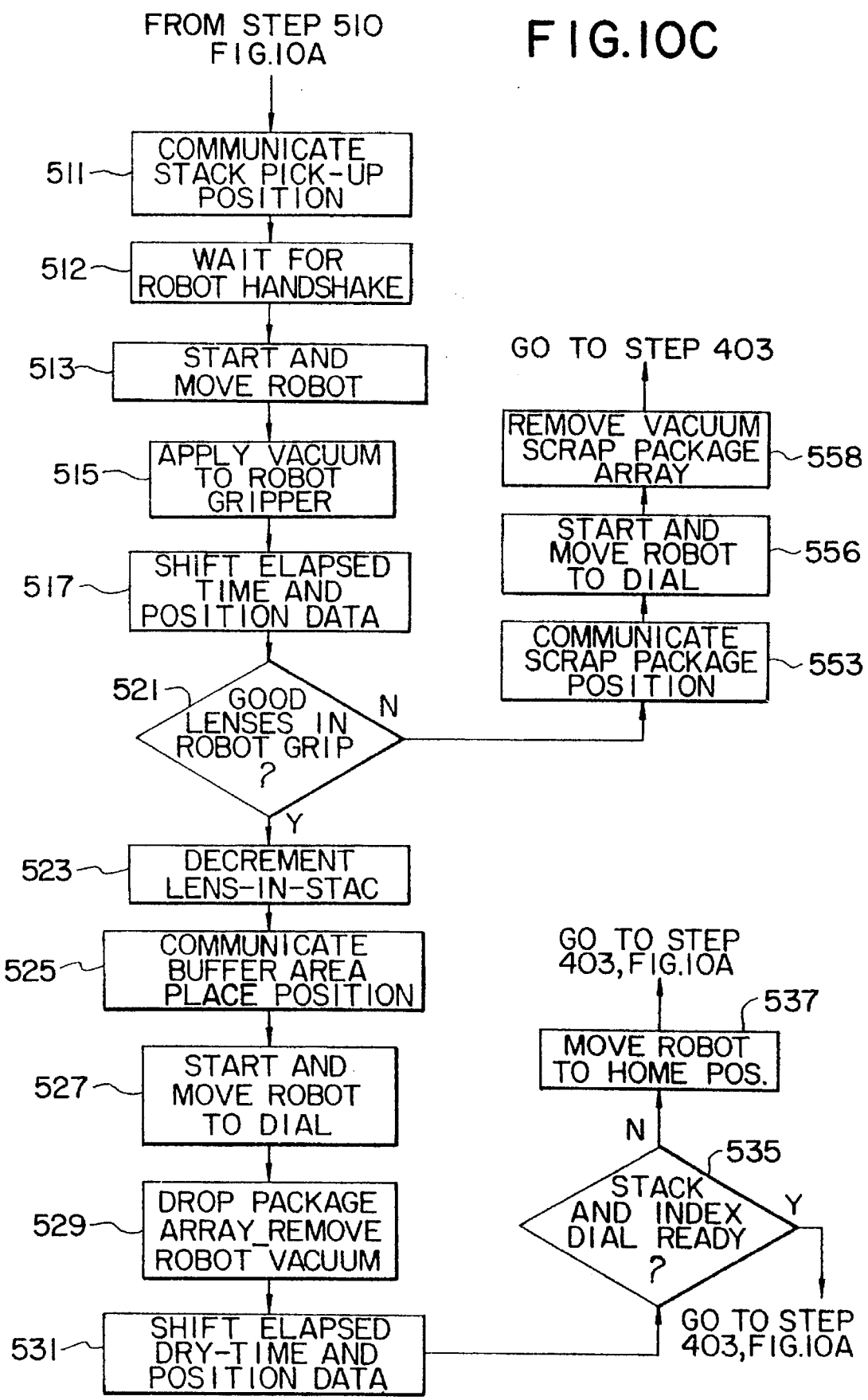

If the PLC determines that the vacuum rail stack is or may be ready with a package array for robot pick-up, but the indexing package dial is not ready to receive the array, then the following actions indicated from steps 510 to 558 in FIG. 10(c) are performed. It should be noted that the indexing package dial may not be ready to receive an array for a variety of reasons, such as: package shingling, saline fluid level out of specification, inaccurate foil placement, etc. These conditions must be properly met before the heat seal die will extend to seal the package and index the package dial for moving the sealed package to the next station, as will be explained in greater detail below.

First, as indicated at step 511 in FIG. 10(c), the coordinates of the first stacking (vacuum rail) position are read into the buffer robot and the PLC waits for the acknowledge signal. After receiving this signal, the robot handshakes an acknowledge signal at step 512 and receives a start signal at step 513 from the PLC to move into the stack pick up position. When the robot reaches that position, the vacuum for the robot gripper is turned on at step 515. At step 517, the time information is transferred from the first position {1} of the vacuum rail, STACK_ARR[1], to the robot tooling position, POS_ARR[50]. Additionally, the lens package status information is transferred from the first position of the vacuum rail, STACK_OCC[1], to the robot tooling position, POS_OCC[50]. The time and status information for the first stack position STACK_ARR[1], STACK_OCC[1], respectively, is then re-initialized to a no data state.

Given the time and status data, the PLC determines if the lenses in the stack were good at step 521. If it is determined that the lenses are good, then the variable representing the total amount of lens packages in the stack LENS_IN_STAC is decremented by ten (10) at step 523. Next, the PLC commands the robot to move the lens package array from the first stack position to a location in the buffer storage area 180. Thus, at step 525, the coordinates for an open buffer delivery (place) position is communicated by the PLC to the buffer robot. After receiving the coordinates, the robot is handshaked and receives a start signal at step 527 to move into the buffer delivery position. When the robot reaches that position, the vacuum for the robot gripper is turned off at step 529 and the package array containing good lenses are delivered to the buffer area 180. At step 531 the elapsed dry time information for the picked array of lens packages is moved from the robot tooling position POS_ARR[50] to the current buffer delivery (place) position represented in array POS_ARR[DEL_POS]. Note that the positional status information is also transferred accordingly, i.e., POS_OCC[DEL_POS]:=POS_OCC[50]. The timer and status information for the previously occupied robot tooling positions POS_ARR[50], POS_OCC[50], respectively, are then re-initialized as containing no data. Next, at step 535 a determination is made as to whether the robot is to be placed in its wait or "home" position. If so, the coordinates for the robot home position are communicated to the robot at step 537 and the start signal for moving the robot to its home position is given at step 537 and the robot handshakes an acknowledge signal. If it is determined at step 535 that the vacuum rail stack is ready to have a package array removed therefrom, and that the package index dial is ready to be serviced, then the process will start all over again at step 403 and the position variables and software interlocks are disabled.

If it is determined at step 521 that the lens packages at the first stack position are bad, then the PLC commands the robot to move the lens package array from the first stack position to the predetermined scrap location 182 in the buffer storage area 180. Thus, at step 553, the coordinates for the scrap delivery position is communicated by the PLC to the buffer robot. After receiving the coordinates, the robot is handshaked and receives a start signal at step 556 to move to the scrap delivery position. At step 558, after the robot gripper has moved to the scrap delivery position, the vacuum for the robot gripper is removed and the array of packages containing timed out lenses are scrapped. The sequence is ready to begin again as indicated at step 403.

Buffer Area Package Delivery to Package Dial

If the PLC determines that the indexing package dial is or may soon be ready with a package array for robot pick-up, but the vacuum rail stack does not have a lens package array for robot pick-up, then the robot will be commanded to pick a good lens package array from the buffer area and place it on the indexing package dial as indicated from steps 610 in FIGS. 10(a) and 10(d). Thus, since the subroutine for calculating a good pick-up position in the buffer, G_PICK_POS, is executed at step 403, the PLC communicates the pick-up position to the buffer robot at step 611. At step 613, the PLC initiates a start signal to enable the robot gripper to move to the buffer area lens package pick-up position and the robot will handshake an acknowledge signal.

Steps 615 and 618 are next concurrently executed to prepare the robot for package pick-up. Specifically, at step 615 the PLC enables the vacuum to be supplied to the buffer robot gripper 65. At step 618, the PLC communicates the coordinates for the predetermined package place position at the indexing package table. At step 620, the elapsed dry time status for the picked array of lens packages is moved from the buffer pick position represented in array POS_ARR[G_PICK_POS] to the robot tooling position represented as POS_ARR[50]. Note that the dry time status is also put into position, i.e., POS_OCC[50]:=POS_OCC[G_PICK_POS]. The timer and status information for the previously occupied good pick position POS_ARR[G_PICK_POS], POS_OCC[G_PICK_POS], respectively, is then re-initialized as containing no data. The buffer robot is now ready to place the array of lens packages to the index package dial and at step 623 it waits until the index dial is ready. Once the PLC determines that the index dial is ready, the start signal is given to the robot to execute the transfer of the package array to the package index dial at step 625 and the PLC waits for the robot gripper to reach its commanded position. Next, after the gripper reaches its delivery position, the vacuum for the robot gripper is turned off at step 629 and the package array is placed at the desired position on the index dial. At step 631, the time information is transferred from the robot tooling position POS_OCC[50] to the index dial position 8, represented as IDX_OCC[8], which now retains the 2×5 array of lens packages. After the robot has dropped off the packages, the PLC commands the robot to retract from its position as indicated at step 633. At step 635, the package index dial is released to advance to its next indexing position and the robot returns to the beginning of the sequence at step 403 in FIG. 10(a).

Buffer Area Bad Package Removal

If the PLC determines that the indexing package dial is not requesting the need for a new lens package array because it has already been serviced, and, that the vacuum rail stack does not have a lens package array for robot pick-up, and furthermore, if it is determined that the buffer storage area has at least one array of packages that is bad and needs to be rejected, then the robot will be commanded to pick the bad lens package array from the buffer area and scrap it at the predetermined scrap location as indicated from steps 710–727 in FIGS. 10(a) and 10(e). The first step, indicated at step 711, is to calculate the bad lens package position in the buffer area so that the robot can scrap it. This is a software subroutine (not shown) that checks the positional status information represented as POS_OCC[CHK_POS] for each buffer position in the storage area. Specifically, the status POS_OCC[CHK_POS] of each position in the buffer area starting from the first position is checked to determine if it contains a value (for e.g., =2) indicating that that lens package is bad at that location. When a bad package position, represented as B_PICK_POS, has been determined, the PLC communicates that pick-up position to the buffer robot at step 713. At step 715, the PLC initiates a start signal to enable the robot gripper to move to the buffer area lens package pick-up position and the robot will handshake an acknowledge signal at step 717. Step 719 is next executed to prepare the robot for package pick-up. Specifically, at step 719, the PLC enables the vacuum to be supplied to the buffer robot gripper 65 so that the robot may pick up the bad lens package. Next, at step 721, the coordinates for the scrap delivery position is communicated by the PLC to the buffer robot. After appropriate robot handshaking, the robot receives a start signal at step 725 to move to the scrap delivery position. At this time, the data contained in the status variables for that particular buffer location POS_ARR[B_PICK_POS], and POS_OCC[B_PICK_POS] is reinitialized as containing no data. At step 727, after the robot gripper has moved to the scrap delivery position, the vacuum for the robot gripper is removed and the array of packages containing timed out lenses are scrapped. The sequence is ready to begin again as indicated at step 403 in FIG. 10(a).

If the PLC determines that the indexing package dial is not requesting the need for a new lens package array because it has already been serviced, and, that the vacuum rail stack has at least one ready array of packages for robot pick-up and is not yet full of packages, and furthermore, if it is determined that the buffer storage area is full with good lens package arrays (that have not timed out), then the PLC will initiate the stack to be released, i.e., enable the pneumatic arm to push the most recently placed lens packages for consolidation at the front of the stack as indicated at step 810 in FIG. 10(f). Then the cycle will again continue at step h1.

As shown in further detail in FIG. 11, after the 2×5 array of package carriers has been deposited on support pallet 201, the pallet is rotated to position 204 where optical sensors verify that a package has been loaded at each position and that the packages are correctly aligned on the pallet. Indexing turntable 200 is then rotated again to station 206 wherein each of the individual package carriers are dosed with approximately 950 microliter of a saline solution. The use of deionized water in the hydration and inspection steps significantly speeds the production line as a whole since the time consuming ionic neutralization of the polymer from which the lenses are made does not occur until after the inspection process. When deionized water is used for hydration and inspection, the final step of the process is to introduce buffered saline solution into the final package with the lens and then seal the lens within the package so that final lens equilibration (ionic neutralization, final hydration and final lens dimensioning) is accomplished in the package at room temperature or during sterilization after the lens has been packaged and sealed.

As discussed in further detail in co-pending patent application U.S.S.N. 08/257,787 entitled "Rotary Packaging Station" assigned to the same assignee as the instant invention and the disclosure of which is incorporated by reference herein, after saline dosing at station 206, the saline level is checked at station 208 by appropriate sensor 208a interfaced with the PLC 100 and the support pallet is then rotated under a final product check station (not shown) to a foil receiving station 210 where a foil pick and place unit, having an array of vacuum suction cups, lifts and places a sheet of laminated covers over the array of package bases. A suitable sensor 210a, interfaced with the PLC 100, is provided to ensure the placement of the foil is within tolerance. The packaging dial 200 is then rotated again to heat sealing station 212 where a heat seal mechanism 220 seals a single strip of foil to five separate package carriers in a single high temperature short cycle sealing operation. Packaging dial 200 is then rotated to position 214 where a reciprocating transfer head 226 removes the sealed product from the packaging dial 200 and transports it in the direction of arrow D for sterilization and cartoning. If the saline fluid level or the placement of the foil is detected as not within predetermined specification, then the PLC will not index the rotary package dial 200 until corrective action is taken. Thus, packages at the consolidation buffer will be transferred for storage in the buffer area 180.

At the heat sealing radial station, an electrically heated seal head is supported by a pneumatic cylinder which presses the heated seal head against the laminated covers on the package bases. A thermocouple measures the temperature of the seal head to maintain the temperature in a range from 200°–265° C. An in-line load cell measures the force generated by the pneumatic cylinder, and when a predetermined force is reached, which is a percentage of a possible maximum force, a timer is initiated. The timer times a relatively short time period of approximately 0.4 to 2.0 seconds, after which the pressure in the pneumatic cylinder is released, thereby forming a seal between each laminated cover and package base which is both detachable and customer friendly. The predetermined force is substantially 2700 newtons, which is approximately 75% of a maximum force of substantially 3600 newtons.

In operation, the back force generated by the pneumatic cylinder is measured by an in-line load cell (not shown) connected with the PLC, and a solid state timer is initiated when a force is reached of approximately 2700 newtons, which is approximately 75% of the peak force of approximately 3600 newtons. The solid state timer times a relatively short time period of approximately 0.4 to 2.0 seconds, after which the pressure in the pneumatic cylinder is released. This approach, when compared with similar prior art approaches, is very hot, very hard and very short, which creates a seal which is both detachable and customer friendly.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

We claim:

1. An interactive control system constructed and arranged for controlling the automatic packaging of contact lens products in a product fabrication facility, said interactive control system comprising:

(a) testing means for determining whether the products are defective;

(b) a first robot device arranged for periodically transferring an individual array of a first predetermined amount of discrete products from a first station to an intermediate conveyor where said individual array is conveyed to a second station; wherein said first robot device removes products from said array that have been determined to be defective by said testing means prior to transfer to said intermediate conveyor and wherein said intermediate conveyor includes a means for consolidating the amount of products of said individual array transferred to said intermediate conveyor, said robot device enabling said consolidating means to consolidate said individual array of products and to ensure that a second predetermined amount of products is available for transfer to said second station; and (c) a controller for initiating a time stamp for said individual array transferred from said first station and determining elapsed time data for said individual array and for generating position status data indicating a good array or a bad array of defective products for said individual array as it is conveyed to said second station, said controller shifting said elapsed time data and position status data for said individual array as it is conveyed on said intermediate conveyor for transfer to said second station.

2. An interactive control system for controlling the automatic packaging of products as claimed in claim 1, further including second robot device for periodically transferring an individual array of said second predetermined amount of individual products from said intermediate conveyor for receipt at said second station, said controller initiating rejection of said array of said second predetermined amount of products by said second robot device when said shifted elapsed time data for that array is greater than a predetermined time limit.

3. An interactive control system for controlling the automatic packaging of products as claimed in claim 2, wherein said second robot rejects said individual array of said second predetermined amount of products at a predetermined scrap location.

4. An interactive control system for controlling the automatic packaging of products as claimed in claim 3 wherein said controller additionally shifts elapsed time data for said individual array of said second predetermined amount and shifts position status data for said individual array as it transferred to said intermediate storage area.

5. An interactive control system for controlling the automatic packaging of products as claimed in claim 2, wherein said controller determines whether said second station is available to receive said array of said second predetermined amount of products at every said period and further enables said second robot device to transfer said individual array of products of said second predetermined amount to an intermediate storage area when it is determined that said second station is not available to receive said array of second predetermined amount of products.

6. An interactive control system for controlling the automatic packaging of products as claimed in claim 5, wherein said controller determines whether said second station is available to receive said array of said second predetermined amount of products at every said period and further enables said second robot device to transfer said individual array of products from said intermediate storage area to said second station when it is determined that an individual array of said second predetermined amount of products is good based on said positional status data.

7. An interactive control system for controlling the automatic packaging of products as claimed in claim 5, wherein said controller determines whether said second station is available to receive said array of said second predetermined amount of products at every said period and further enables said second robot device to transfer said individual array of products from said intermediate storage area to said second station when it is determined that an individual array of a second predetermined amount of products in not available for transfer from said intermediate conveyor.

8. An interactive control system for controlling the automatic packaging of products as claimed in claims 6 or 7, wherein said second station includes an indexing package dial, said second robot device transferring said individual array of said second predetermined amount of products to a predetermined location on said indexing dial.

9. An interactive control system for controlling the automatic packaging of products as claimed in claim 8, wherein said controller initiates said indexing package dial to index said array of said second predetermined amount to a subsequent location after said array is transferred to said dial.

10. An interactive control system for controlling the automatic packaging of products as claimed in claim 1, wherein said individual array of said first predetermined amount of products are arranged in first row and second rows of products for conveyance on said intermediate conveyor, said first robot device including means for simultaneously gripping said first and second row prior to transferring said products to said intermediate conveyor.

11. An interactive control system for controlling the automatic packaging of products as claimed in claim 10, wherein said intermediate conveyor comprises first and second rails, said controller enabling said first robot device to transfer each first row of products to said first rail and said second row of products to said second rail, and further determines the amount of products transferred on each respective first and second rail at every period.

12. An interactive control system for controlling the automatic packaging of products as claimed in claim 11, wherein said controller enables said first robot device to maintain the difference in the amount of products transferred to said first and second rail to within a predetermined amount.

13. An interactive control system for controlling the automatic packaging of products as claimed in claim 12, wherein said predetermined amount is one (1) package.

14. An interactive control system for controlling the automatic packaging of contact lenses as claimed in claim 1, wherein contact lenses are contained in a deionized water solution in said packages, said first station including a deionized water removal device for removing said deionized water from each package of said individual array prior to their transference from said first station.

15. An interactive control system for controlling the automatic packaging of contact lenses as claimed in claim 14, wherein said controller generates said time stamp when said deionized water is removed from said packages.

16. An interactive control system constructed and arranged for controlling the automatic packaging of contact lenses in a contact lens fabrication facility, said interactive control system comprising:

(a) testing means for determining whether contact lenses or contact lens packages is defective;

(b) a first robot device arranged for periodically transferring an individual array of a first predetermined amount of discrete contact lens packages each containing a contact lens therein from a first station to an intermediate conveyor where said individual array is conveyed to a second station; wherein said robot device removes contact lens packages from said array that have been determined to be defective by said testing means prior to transfer to said intermediate conveyor and wherein said intermediate conveyor includes a means for consolidating the lens packages of said individual array transferred to said intermediate conveyor, said robot device enabling said consolidating means to consolidate said individual array of packages to ensure that a second predetermined amount of packages is available for transfer to said second station; and (c) a controller for initiating a time stamp for said individual array transferred from said first station and determining elapsed time data for each individual array and for generating position status data indicating a good array or a bad array of defective lenses for said individual array as it is conveyed to said second station, said controller shifting said elapsed time data and position status data for said individual array as it is conveyed on said intermediate conveyor for transfer to said second station.

17. An interactive control system for controlling the automatic packaging of contact lenses as claimed in claim 16, wherein said robot device rejects contact lens packages of said array that may previously have been determined to be defective prior to transfer to said intermediate conveyor.

18. An interactive control system for controlling the automatic packaging of contact lenses as claimed in claim 17, wherein said intermediate conveyor includes a means for consolidating the amount contact lens packages of said individual array transferred to said intermediate conveyor, said controller enabling said consolidating means to consolidate said individual array of packages to ensure that a second predetermined amount of packages is available for transfer to said second station.

19. An interactive control system for controlling the automatic packaging of contact lenses as claimed in claim 16, further including a second robot device for periodically transferring an individual array of said second predetermined amount of individual packages from said intermediate conveyor for receipt at said second station, said controller initiating rejection of said array of said second predetermined amount of packages by said second robot device when said shifted elapsed time data for that individual array is greater than a predetermined time limit.

20. An interactive control system for controlling the automatic packaging of contact lenses as claimed in claim 19, wherein said second robot rejects said individual array of said second predetermined amount of packages at a predetermined scrap location.

21. An interactive control system for controlling the automatic packaging of contact lenses as claimed in claim 19, wherein said controller determines whether said second station is available to receive said array of said second predetermined amount of packages at every said period, and further enables said second robot device to transfer said individual array of packages of said second predetermined amount to an intermediate storage area when it is determined that said second station is not available to receive said array of second predetermined amount of packages.

22. An interactive control system for controlling the automatic packaging of contact lenses as claimed in claim 21, wherein said controller determines whether said second station is available to receive said array of said second predetermined amount of packages at every said period and further enables said second robot device to transfer said individual array of packages from said intermediate storage area to said second station when it is determined that an individual array of said second predetermined amount of packages is good based on said positional status data.

23. An interactive control system for controlling the automatic packaging of contact lenses as claimed in claim 21, wherein said controller determines whether said second station is available to receive said array of said second predetermined amount of packages at every said period and further enables said second robot device to transfer said individual array of packages from said intermediate storage area to said second station when it is determined that an individual array of a second predetermined amount of products in not available for transfer from said intermediate conveyor.

24. An interactive control system for controlling the automatic packaging of contact lenses as claimed in claims 22 or 23, wherein said second station includes an indexing package dial, said second robot device transferring said individual array of said second predetermined amount to a predetermined location on said indexing dial.

25. An interactive control system for controlling the automatic packaging of contact lenses as claimed in claim 24, wherein said controller initiates said indexing package dial to index said array of said second predetermined amount to a subsequent location after said array is transferred to said dial.

26. An interactive control system for controlling the automatic packaging of contact lenses as claimed in claim 25, wherein said packages are indexed on said indexing package dial to a saline fill location where said packages containing said contact lenses are filled with a saline solution.

27. An interactive control system for controlling the automatic packaging of contact lenses as claimed in claim 20 wherein said controller additionally shifts elapsed time data for said individual array of said second predetermined amount and shifts position status data for said individual array as it transferred to said intermediate storage area.

28. An interactive control system for controlling the automatic packaging of contact lenses as claimed in claim 19, wherein said time limit is about 12 minutes to about 14 minutes.

29. An interactive control system for controlling the automatic packaging of contact lenses as claimed in claim 16, wherein said individual array of said first predetermined amount of packages are arranged in first row and second rows of packages for conveyance on said intermediate conveyor, said first robot device including means for simultaneously gripping said first and second row prior to transferring said packages to said intermediate conveyor.

30. An interactive control system for controlling the automatic packaging of contact lenses as claimed in claim 29, wherein said intermediate conveyor comprises first and second rails, said controller enabling said first robot device to transfer each first row of packages to said first rail and said second row of packages to said second rail, and further determines the amount of packages transferred on each respective first and second rail at every period.

31. An interactive control system for controlling the automatic packaging of contact lens as claimed in claim 30, wherein said controller enables said first robot device to maintain the difference in the amount of packages transferred to said first and second rail to within a predetermined amount.

32. An interactive control system for controlling the automatic packaging of contact lenses as claimed in claim 31, wherein said predetermined amount is one (1) package.

33. An interactive control system for controlling the automatic packaging of products as claimed in claims 1 or 16, wherein said elapsed time data for said individual array and position status data indicating a good array or a bad array of defective lenses for said individual array is stored in a corresponding memory locations for said controller.

34. An interactive control system for controlling the automatic packaging of products as claimed in claim 33, wherein said elapsed time data for said individual array and position status data are shifted in said controller memory as said individual array are conveyed toward said second station.

\* \* \* \* \*